(12) United States Patent
Kumar et al.

(10) Patent No.: US 9,576,010 B2
(45) Date of Patent: Feb. 21, 2017

(54) MONITORING AN APPLICATION ENVIRONMENT

(71) Applicant: eBay Inc., San Jose, CA (US)

(72) Inventors: Abhinav Kumar, San Jose, CA (US); Ravinder Purumala, Sunnyvale, CA (US); Premendra Singh, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/659,058

(22) Filed: Mar. 16, 2015

(65) Prior Publication Data

US 2015/0186436 A1 Jul. 2, 2015

Related U.S. Application Data

(63) Continuation of application No. 13/196,516, filed on Aug. 2, 2011, now Pat. No. 8,983,966, which is a continuation-in-part of application No. 12/986,877, filed on Jan. 7, 2011, now Pat. No. 8,621,259, which is a continuation of application No. 12/414,543, filed on Mar. 30, 2009, now Pat. No. 7,870,420, which is
(Continued)

(51) Int. Cl.
  *G06F 17/30* (2006.01)
  *G06F 11/34* (2006.01)

(52) U.S. Cl.
  CPC ..... *G06F 17/30321* (2013.01); *G06F 11/3476* (2013.01); *G06F 11/3495* (2013.01); *G06F 17/30091* (2013.01); *G06F 11/3409* (2013.01); *G06F 11/3452* (2013.01); *G06F 2201/805* (2013.01); *G06F 2201/87* (2013.01); *G06F 2201/875* (2013.01)

(58) Field of Classification Search
  USPC .................................................. 707/609, 741
  See application file for complete search history.

(56) References Cited

U.S. PATENT DOCUMENTS 5,841,981 A 11/1998 Kondo
5,872,912 A 2/1999 Brownmiller et al.
(Continued)

OTHER PUBLICATIONS

"U.S. Appl. No. 11/057,702, Advisory Action mailed Aug. 22, 2008", 3 pgs.
(Continued)

*Primary Examiner* — Hanh Thai
(74) *Attorney, Agent, or Firm* — Schwegman, Lundberg & Woessner, P.A.

(57) ABSTRACT

In various embodiments, a system and related method for organizing transactional data from an application environment is disclosed. In some embodiments, a system includes a file system and one or more daemon indexers in electrical communication with the file system. The file system is arranged as a non-relational and serverless file system to allow for cost-effectiveness with ready scalability. The file system is to receive, in substantially real-time, unsorted transactional data from a publishing module. The one or more daemon indexers are arranged to receive the unsorted transactional data from the file system, organize the unsorted transactional data by operational characteristics, and store the organized transactional data on the file system. Other systems and methods are disclosed.

20 Claims, 15 Drawing Sheets

Related U.S. Application Data a continuation of application No. 11/057,702, filed on Feb. 14, 2005, now Pat. No. 7,526,670, which is a continuation of application No. 10/843,264, filed on May 10, 2004, now abandoned.

(60) Provisional application No. 60/548,357, filed on Feb. 27, 2004.

(56) References Cited

U.S. PATENT DOCUMENTS

| | | | |
|---|---|---|---|
| 5,913,036 A | 6/1999 | Brownmiller et al. | |
| 5,960,173 A * | 9/1999 | Tang | G06F 8/38 348/14.08 |
| 6,078,918 A * | 6/2000 | Allen | G06F 17/276 |
| 6,141,777 A | 10/2000 | Cutrell et al. | |
| 6,148,338 A * | 11/2000 | Lachelt | H04L 41/0631 709/224 |
| 6,258,939 B1 | 7/2001 | Reiter et al. | |
| 6,397,167 B2 * | 5/2002 | Skinner | B21B 37/50 702/183 |
| 6,401,116 B1 | 6/2002 | Okigami | |
| 6,567,818 B1 * | 5/2003 | Frey | G06F 9/465 707/694 |
| 6,635,468 B2 | 10/2003 | Ashkenazi et al. | |
| 6,636,983 B1 | 10/2003 | Levi | |
| 6,705,990 B1 * | 3/2004 | Gallant | A61B 5/0205 128/903 |
| 6,738,813 B1 * | 5/2004 | Reichman | G06Q 10/06 709/223 |
| 6,824,780 B1 | 11/2004 | Devaux et al. | |
| 6,832,341 B1 | 12/2004 | Vijayan | |
| 6,918,067 B2 | 7/2005 | Bartucca et al. | |
| 6,978,297 B1 | 12/2005 | Piersol | |
| 7,010,718 B2 * | 3/2006 | Ogawa | G06F 11/0709 709/224 |
| 7,043,505 B1 | 5/2006 | Teague et al. | |
| 7,065,566 B2 | 6/2006 | Menard et al. | |
| 7,181,653 B2 | 2/2007 | Challener et al. | |
| 7,243,124 B1 * | 7/2007 | Gardner | G06Q 10/10 709/205 |
| 7,272,660 B1 * | 9/2007 | Powers | G06Q 10/00 370/338 |
| 7,290,056 B1 * | 10/2007 | McLaughlin, Jr. | H04L 43/0852 709/201 |
| 7,356,559 B1 | 4/2008 | Jacobs et al. | |
| 7,493,624 B1 * | 2/2009 | Kautzleben | G06F 11/3409 718/100 |
| 7,526,670 B2 | 4/2009 | Lloyd et al. | |
| 7,725,570 B1 * | 5/2010 | Lewis | G06Q 10/04 709/223 |
| 7,730,489 B1 * | 6/2010 | Duvur | G06F 9/466 714/2 |
| 7,870,420 B2 | 1/2011 | Lloyd et al. | |
| 8,442,844 B1 | 5/2013 | Trandal et al. | |
| 8,589,265 B2 | 11/2013 | Clemm et al. | |
| 8,621,259 B2 | 12/2013 | Lloyd et al. | |
| 8,983,966 B2 | 3/2015 | Kumar et al. | |
| 2001/0056428 A1 | 12/2001 | Gajda et al. | |
| 2002/0010803 A1 * | 1/2002 | Oberstein | G06Q 10/10 719/318 |
| 2002/0087680 A1 | 7/2002 | Cerami et al. | |
| 2003/0023745 A1 * | 1/2003 | Noe | H04L 29/06 709/235 |
| 2003/0055863 A1 * | 3/2003 | Spiegel | G06F 9/5061 718/104 |
| 2003/0120593 A1 | 6/2003 | Bansal et al. | |
| 2003/0145186 A1 * | 7/2003 | Szendy | G06F 11/3466 711/173 |
| 2003/0167326 A1 * | 9/2003 | de Bonet | G06F 11/3072 709/224 |
| 2003/0225604 A1 | 12/2003 | Casati et al. | |
| 2004/0010720 A1 * | 1/2004 | Singh | H04H 20/82 709/224 |
| 2004/0015575 A1 * | 1/2004 | Motoyama | H04W 48/14 709/222 |
| 2004/0030689 A1 | 2/2004 | Anderson et al. | |
| 2004/0117624 A1 * | 6/2004 | Brandt | H04L 63/1408 713/166 |
| 2004/0143562 A1 | 7/2004 | Chen et al. | |
| 2004/0220947 A1 * | 11/2004 | Aman | G06F 11/3433 |
| 2004/0236989 A1 * | 11/2004 | Pavlik | H04L 29/06 714/15 |
| 2004/0243349 A1 * | 12/2004 | Greifeneder | H04L 63/166 702/183 |
| 2005/0049924 A1 * | 3/2005 | DeBettencourt | H04L 43/028 705/21 |
| 2005/0065756 A1 | 3/2005 | Hanaman et al. | |
| 2005/0188221 A1 * | 8/2005 | Motsinger | G06F 21/55 726/5 |
| 2005/0249169 A1 * | 11/2005 | Fong | H04L 12/2803 370/338 |
| 2005/0262136 A1 | 11/2005 | Lloyd et al. | |
| 2006/0031457 A1 * | 2/2006 | Motoyama | H04L 12/2803 709/224 |
| 2006/0059253 A1 | 3/2006 | Goodman et al. | |
| 2006/0194185 A1 | 8/2006 | Goldberg et al. | |
| 2006/0195525 A1 * | 8/2006 | Page | G06F 9/5033 709/206 |
| 2006/0200490 A1 | 9/2006 | Abbiss | |
| 2006/0259592 A1 | 11/2006 | Angeline | |
| 2006/0282333 A1 | 12/2006 | Yongnian | |
| 2007/0203711 A1 | 8/2007 | Nation et al. | |
| 2007/0208572 A1 | 9/2007 | Habichler et al. | |
| 2007/0208575 A1 | 9/2007 | Habichler et al. | |
| 2007/0218434 A1 | 9/2007 | Habichler et al. | |
| 2008/0021866 A1 | 1/2008 | Hinton et al. | |
| 2008/0046505 A1 * | 2/2008 | Netsch | H04L 12/581 709/203 |
| 2008/0046536 A1 * | 2/2008 | Broda | H04L 67/2842 709/217 |
| 2008/0046556 A1 * | 2/2008 | Nicholls | G06Q 10/06311 709/224 |
| 2009/0150565 A1 | 6/2009 | Grossner et al. | |
| 2009/0164915 A1 | 6/2009 | Gasn et al. | |
| 2009/0177644 A1 | 7/2009 | Martinez et al. | |
| 2009/0198824 A1 | 8/2009 | Taylor | |
| 2009/0204672 A1 | 8/2009 | Jetha et al. | |
| 2009/0228741 A1 | 9/2009 | Lloyd et al. | |
| 2009/0276771 A1 | 11/2009 | Nickolov et al. | |
| 2010/0036806 A1 | 2/2010 | Lam et al. | |
| 2010/0036807 A1 | 2/2010 | Lieske, Jr. et al. | |
| 2010/0262461 A1 | 10/2010 | Bohannon | |
| 2011/0099430 A1 | 4/2011 | Lloyd et al. | |
| 2011/0106806 A1 | 5/2011 | Tamas et al. | |
| 2011/0289092 A1 | 11/2011 | Kumar et al. | |
| 2012/0078643 A1 * | 3/2012 | Nagpal | G06Q 30/02 705/1.1 |
| 2012/0179766 A1 | 7/2012 | Gracy et al. | |
| 2014/0207818 A1 | 7/2014 | Jellick et al. | |

OTHER PUBLICATIONS

"U.S. Appl. No. 11/057,702, Decision on Pre-Appeal Brief Request mailed Oct. 28, 2008", 2 pgs.

"U.S. Appl. No. 11/057,702, Final Office Action mailed Jun. 13, 2008", 13 pgs.

"U.S. Appl. No. 11/057,702, Non-Final Office Action mailed Nov. 1, 2007", 11 pgs.

"U.S. Appl. No. 11/057,702, Notice of Allowance mailed Dec. 16, 2008", 4 pgs.

"U.S. Appl. No. 11/057,702, Pre-Appeal Brief Request filed Sep. 5, 2008", 5 pgs.

"U.S. Appl. No. 11/057,702, Response filed Feb. 1, 2008 to Non-Final Office Action mailed Nov. 1, 2007", 15 pgs.

"U.S. Appl. No. 11/057,702, Response filed Aug. 8, 2008 to Final Office Action mailed Jun. 13, 2008", 17 pgs.

"U.S. Appl. No. 11/057,702, Response filed Nov. 25, 2008 to Decision on Pre-Appeal mailed Oct. 28, 2008", 10 pgs.

"U.S. Appl. No. 12/414,543, Non-Final Office Action mailed Apr. 30, 2010", 15 pgs.

(56) References Cited

OTHER PUBLICATIONS

"U.S. Appl. No. 12/414,543, Notice of Allowance mailed Sep. 7, 2010", 4 pgs.

"U.S. Appl. No. 12/414,543, Response filed Jul. 2, 2010 to Non Final Office Action mailed Apr. 30, 2010", 13 pgs.

"U.S. Appl. No. 12/986,877 , Response filed Apr. 9, 2013 to Non Final Office Action mailed Jan. 9, 2012", 7 pgs.

"U.S. Appl. No. 12/986,877, Non Final Office Action mailed Nov. 30, 2012", 8 pgs.

"U.S. Appl. No. 12/986,877, Notice of Allowance mailed May 23, 2013", 6 pgs.

"U.S. Appl. No. 12/986,877, Notice of Allowance mailed Aug. 29, 2013", 6 pgs.

"U.S. Appl. No. 13/196,516, Final Office Action mailed Jan. 10, 2014", 19 pgs.

"U.S. Appl. No. 13/196,516, Final Office Action mailed Jan. 30, 2013", 12 pgs.

"U.S. Appl. No. 13/196,516, Non Final Office Action mailed Apr. 24, 2014", 17 pgs.

"U.S. Appl. No. 13/196,516, Non Final Office Action mailed Jul. 8, 2013", 13 pgs.

"U.S. Appl. No. 13/196,516, Non Final Office Action mailed Aug. 6, 2012", 11 pgs.

"U.S. Appl. No. 13/196,516, Notice of Allowance mailed Nov. 4, 2014", 11 pgs.

"U.S. Appl. No. 13/196,516, Preliminary Amendment filed Oct. 20, 2011", 6 pgs.

"U.S. Appl. No. 13/196,516, Response filed Apr. 9, 2014 to Final Office Action mailed Jan. 10, 2014", 11 pgs.

"U.S. Appl. No. 13/196,516, Response filed May 29, 2013 to Final Office Action mailed Jan. 30, 2013", 12 pgs.

"U.S. Appl. No. 13/196,516, Response filed Jul. 24, 2014 to Non Final Office Action mailed Apr. 24, 2014", 12 pgs.

"U.S. Appl. No. 13/196,516, Response filed Oct. 8, 2013 to Non Final Office Action mailed Jul. 8, 2013", 11 pgs.

"U.S. Appl. No. 13/196,516, Response filed Nov. 6, 2012 to Non Final Office Action mailed Aug. 6, 2012", 11 pgs.

"International Application Serial No. PCT/US2004/014780, International Search Report mailed Aug. 17, 2004", 3 pgs.

"International Application Serial No. PCT/US2004/014780, Written Opinion mailed Aug. 17, 2004", 4 pgs.

"International Application Serial No. PCT/US2004/014780, International Preliminary Report on Patentability mailed Sep. 8, 2006", 8pgs.

Chen, Mike, "Failure Diagnosis Using Decision Trees", International Conference on Autonomic Computing (ICAC-04), (May 2004), 1-8.

Chen, Mike, "Path-Based Failure and Evolution Management", Proceedings of the First Symposium on Networked Systems Design and Implementation (NSDI), (Mar. 29, 2004), 1-14.

Chen, Mike, et al., "Pinpoint Problem Determination in Large, Dynamic Internet Services", In Proceedings on the Intl. Conference on Dependable Systems and Networks, (2002), 10 pgs.

Chen, Mike, et al., "Pinpoint: problem determination in large, dynamic Internet services", International Conference on Dependable Systems and Networks, IEEE, (Jun. 23-26, 2002), 595-604.

Patent Cooperation Treaty, "International Search Report".

Vinoski, Steve, "CORBA: integrating diverse applications within distributed heterogeneous environments", IEEE Communications Magazine, 35(2), (Feb. 1997), 46-55.

* cited by examiner

| POOL | MACHINE | TxType | TxName | STATUS | DURATION |
|---|---|---|---|---|---|
| Cgi0 | Digdug | URL | AcceptBid | 0 | 140ms |
| Cgi5 | Giro | SQL | AddFeedBack | ORA-Constraint | 3.2ms |
| Icgi3 | Hobart | Email | SendQueryEmail | 0 | 123ms |
| Cgi0 | DigDug | URL | AcceptBid | 0 | 161ms |
| ... | ... | ... | ... | ... | ... |

*Fig. 7*

MONITORING AN APPLICATION ENVIRONMENT

The present application claims the priority benefit as a continuation of U.S. patent application Ser. No. 13/196,516, filed Aug. 2, 2011, which is a continuation in part of U.S. patent application Ser. No. 12/986,877, filed Jan. 7, 2011 (now U.S. Pat. No. 8,621,259), which is a continuation of U.S. patent application Ser. No. 12/414,543 (now U.S. Pat. No. 7,870,420), filed Mar. 30, 2009, which is a continuation of U.S. patent application Ser. No. 11/057,702 (now U.S. Pat. No. 7,526,670), filed Feb. 14, 2005, and U.S. patent application Ser. No. 10/843,264, filed May 10, 2004, now abandoned, which claims the priority benefit of U.S. Provisional Application Ser. No. 60/548,357, filed Feb. 27, 2004, all of which are incorporated herein by reference in their entirety.

TECHNICAL FIELD

An embodiment relates generally to the field of system monitoring and administration and, more specifically, to a method and system to monitor a diverse heterogeneous application environment.

BACKGROUND

As the complexity and throughput of application environments has increased, the technical challenges present in the monitoring, maintenance and administration of such application environments have also substantially increased. These technical challenges are particularly acute in enterprise application environments and Web-based (e.g., Application Service Provider (ASP)) environments, which may include a large number of applications servicing a large number of users and handling a large number of transactions. Consider, for example, a popular Web site that may be serviced by a rich application environment, including a large number of applications hosted on a collection of respective application servers. Such an application environment may include hundreds of diverse and heterogeneous applications, and may be required to handle millions of Uniform Resource Location (URL) requests, millions of e-mail messages, and billions of database inquiries (e.g., utilizing SQL statements) in a 24-hour period.

A failure in such an application environment can be disastrous, particularly where the application environment supports a live and real-time service (e.g., online or network-base commerce). The ability to monitor and quickly identify problems that may arise within an application environment is of course important for a number of reasons, and presents a number of technical challenges.

SUMMARY

In various embodiments, a system and related method for organizing transactional data from a diverse and heterogeneous application environment is disclosed. In an example embodiment, a system includes a file system and one or more daemon indexers in electrical communication with the file system. The file system is arranged as a non-relational and serverless file system to allow for cost-effectiveness with ready scalability. The file system is to receive, in substantially real-time, unsorted transactional data from a publishing module. The one or more daemon indexers are arranged to receive the unsorted transactional data from the file system, organize the unsorted transactional data by operational characteristics, and store the organized transactional data on the file system.

In another example embodiment, a method to organize transactional data in a diverse and heterogeneous application environment is disclosed. The method includes receiving the transactional data from a file system, organizing the transactional data by operational characteristics, indexing the data in a non-relational manner, and storing the indexed data for subsequent retrieval.

Other features of the present invention will be apparent from the accompanying drawings and from the detailed description that follows. Further, as used herein, the term "or" may be construed in an exclusive or an inclusive sense.

BRIEF DESCRIPTION OF THE DRAWINGS

An embodiment is illustrated by way of example and not limitation in the figures of the accompanying drawings, in which like references indicate similar elements and in which:

FIG. 7 illustrates an exemplary transaction table that includes rows of transaction data, suitable for insertion into an OLAP data structure that may be generated by harvesters, in one exemplary embodiment.

DETAILED DESCRIPTION

A method and a system to monitor a diverse heterogeneous application environment are described. In the following description, for purposes of explanation, numerous specific details are set forth in order to provide a thorough understanding of the present invention. It will be evident, however, to one skilled in the art that the present invention may be practiced without these specific details.

Figure 1:
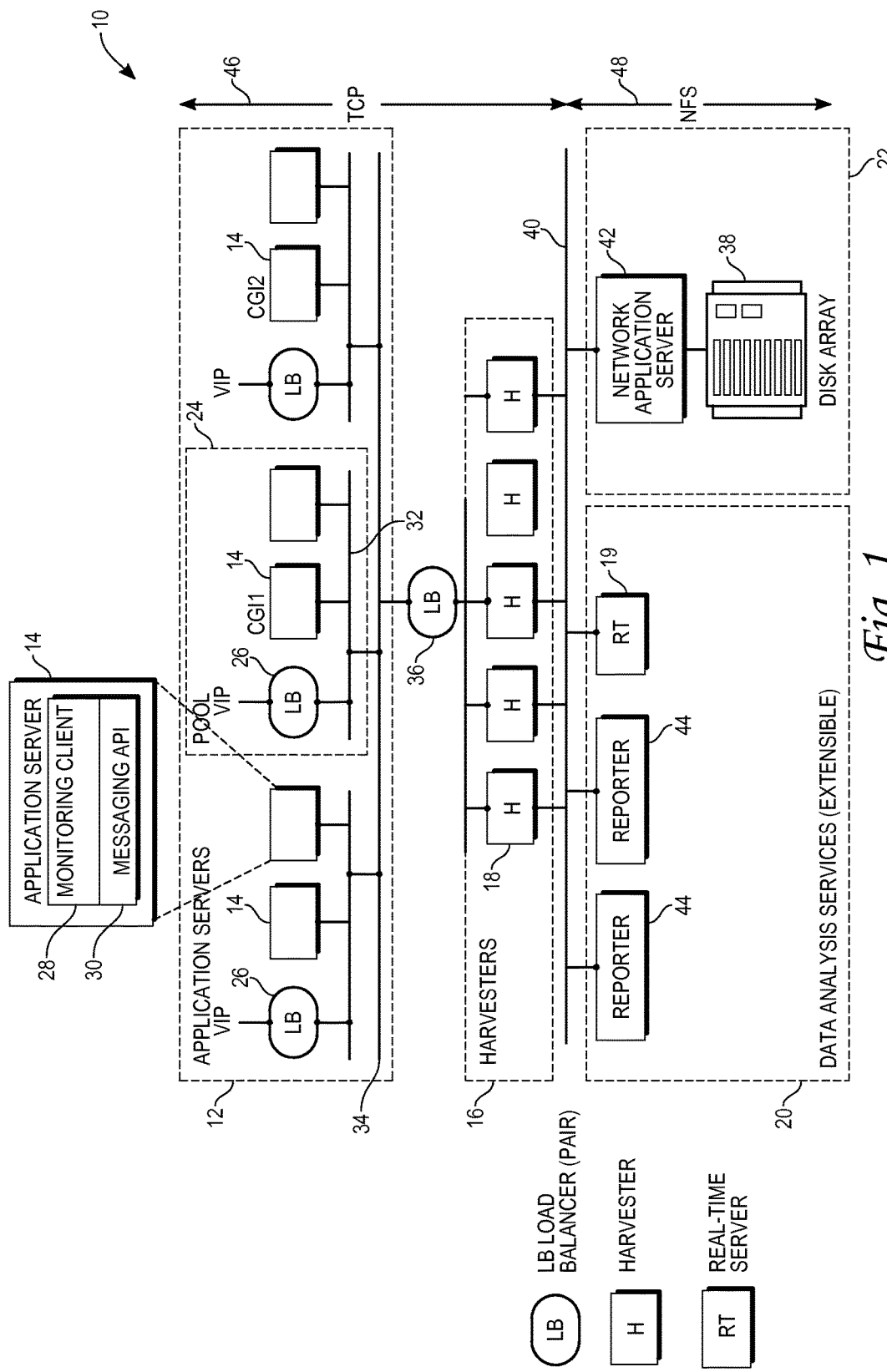
FIGS. 1-3 are block diagrams illustrating respective exemplary embodiments of systems to monitor a diverse and heterogeneous application environment.
Figure 2:
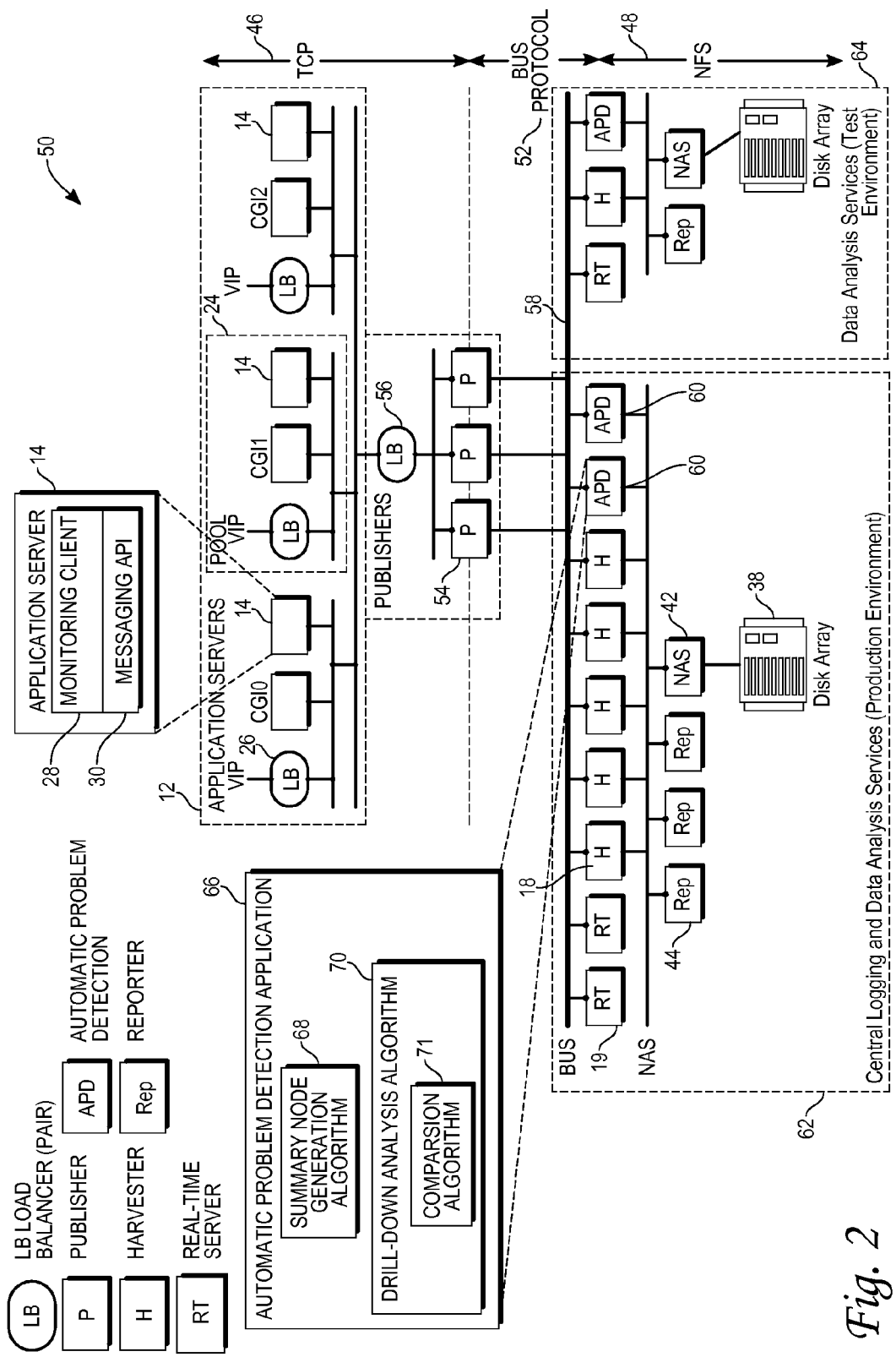
Figure 3:
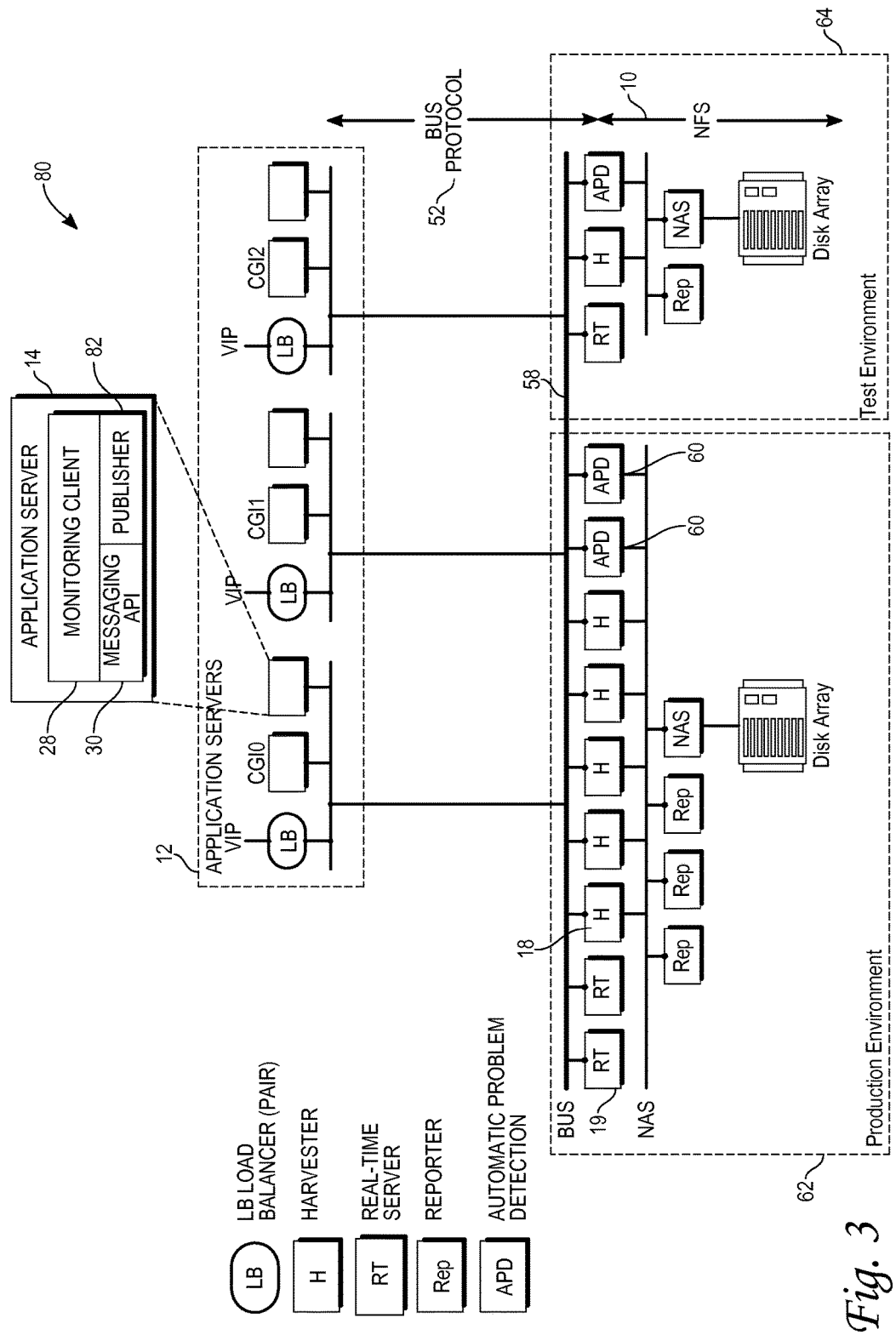

FIGS. 1-3 are block diagrams illustrating respective exemplary embodiments of systems to monitor a diverse heterogeneous application environment, according to the present invention. The monitored application environment may, for example, include a large number of applications, each hosted on a respective application server and providing distinct application services. The diverse heterogeneous application environment may, for example, include applications providing, at one end of the spectrum, unrelated and distinct services or may include applications that provide distinct but partially or directly related services (e.g., purchase process and billing services).

FIG. 1 is a block diagram illustrating a system 10, according to a first exemplary embodiment, to monitor a diverse and heterogeneous application environment. A cluster 12 of application servers 14 is shown to be coupled to, and in communication with, a cluster 16 of harvesters 18. The cluster 16 of harvesters 18 is then coupled to an extensible collection of data analysis services 20, and a central logging system 22.

Returning to the cluster 12 of application servers 14, pools 24 of application servers 14 may be locally networked, and associated with a dedicated load balancer 26 that operates to balance load between the application servers 14 within a particular pool 24. The application servers 14 within a particular pool 24 may provide a common set of application services.

Each of the application servers 14 is furthermore instrumented with a monitoring client 28 that, as will be described in further detail below, monitors a predetermined set of activities and parameters of a host application server, and communicates messages reflecting such activities and parameters utilizing a messaging Application Program Interface (API) 30. The messaging API 30 defines a common syntax, which will be described more fully below, to communicate with the cluster 16 of harvesters 18 and the central logging system 22. The common syntax allows a "decoupling" of the application servers 14 from the harvesters 18 and the central logging system 22.

Logging data, generated by the monitoring client 28 and communicated by the messaging API 30, may be transmitted from an application server 14 via a local pool network 32, and an application server network 34, to a load balancer 36, which distributes the messages to harvesters 18 included within the cluster 16. The harvesters 18 then operate to write logs, including the logging data received in the logging data messages, to a disk array 38 via a network 40 and a network application server (NAS) 42.

The data analysis services 20 may, as will be described in further detail below, include a number of services. In the exemplary embodiment illustrated in FIG. 1, a number of reporters 44 operate to generate periodic (e.g., hourly and daily) reports regarding activities and parameters of the application servers 14, utilizing the logs written into the disk array 38. Specifically, the reporters 44 may retrieve the logs from the disk array 38 via the local network 40 and the network application server 42. The reports generated by the reporters 44 may be so-called "static" reports, in that they present a static view of the logging data for a particular time period.

In contrast to the "static" reports generated by the reporters 44, real-time servers 19 operates to aggregate received logging data from the harvesters 18, via the network 40, in near real-time, and to present a number of near real-time views of activities and parameters pertaining to the application servers 14. For example, one or more real-time servers 19 may present aggregated statistics regarding the various parameters pertaining to individual application servers 14, or collections (e.g., pools 24) of application servers, or of all applications across the entire cluster 12 of application servers 14.

In the exemplary system 10 illustrating FIG. 1, communications between the application servers 14 and the cluster 16 of harvesters 18 are shown to be performed utilizing the Transmission Control Protocol (TCP) 46. Communications between the harvesters 18, the real-time servers 19, the data analysis services 20, and the central logging system 22 are shown to be performed utilizing the Network File System (NFS), which is a client/application communication systems that allows network users to access shared files stored on computers of different types.

The exemplary embodiments illustrated in FIGS. 2 and 3 are architected utilizing a publish/subscribe messaging communications system 50, which utilizes a publish/subscribe messaging bus to communicate messages between various entities.

Specifically, FIG. 2 is a block diagram illustrating a system 50, according to a further exemplary embodiment, to monitor a diverse, heterogeneous application environment. As with the system 10, described above with reference to FIG. 1, the system 50 includes a number of monitoring clients 28 that are utilized to instrument application servers 14 included within a cluster 12 of application servers. The application servers 14 may also, as illustrated, be arranged in pools 24. The architecture of the system 50 departs from that of the system 10 illustrated in FIG. 1 in that a publish/subscribe message bus communications protocol 52 is utilized to communicate logging data messages, generated by the monitoring clients 28 and conforming to the messaging API 30. Specifically, messages are communicated from the monitoring client 28, utilizing the messaging API 30, to one or more publishers 54, via a load balancer 56. The logging data messages are then published by the publishers 54 onto a publish/subscribe messaging bus 58. The real-time servers 19, the harvesters 18 and one or more further data analysis services (e.g., an Automatic Problem Detection (APD) service provided by one or more APD servers 60) are instrumented with subscriber components, and are accordingly able to subscribe to the logging data messages that are published by the publishers 54 onto the publish/subscribe messaging bus 58. The harvesters 18 then, in the same manner as described above with reference to FIG. 1, communicate logging data to one or more reporters 44, and also write appropriate logs into the disk array 38 via the network application server 42. Communications between the harvesters 18, the reporters 44, and the disk array 38 are shown to be performed utilizing the Network File System (NFS). FIG. 2 illustrates that the collection of real-time servers 19, harvesters 18, Automatic Problem Detection (APD) servers 60, reporters 44, Network Application Server 42, and the disk array 38 may be considered to be a central logging and data analysis service 62. FIG. 2 also illustrates that the system 50 may include a production environment of the central logging and data analysis services, as well as a test environment 64.

As noted above, the data analysis services 62 are shown to include one or more Application Problem Detection (APD) servers 60, each of which hosts an Automatic Problem Detection (APD) application 66. Each APD application 66 operates, in one exemplary, to analyze logging data messages, received from the monitoring clients 28 via the messaging bus 58, in near real-time to detect actual or potential problems, and to generate alerts. These alerts may, in one embodiment, be connected to appropriate direct or indirect actions. To this end, each APD application 66 is shown in FIG. 2 to include a summary node generation algorithm 68 and a drill-down analysis algorithm 70. Each drill-down analysis algorithm 70 includes a comparison algorithm 71. The functioning of an exemplary embodiment of an APD application 66 will be described in further detail below.

FIG. 3 is a block diagram illustrating a system 80, according to yet a further exemplary embodiment, to monitor a diverse and heterogeneous application environment. The system 80 is similar to that shown in FIG. 3, but differs in that the monitoring clients 28 no longer communicate with publishers 54 utilizing TCP, but publish logging data messages directly onto the publish/subscribe messaging bus 58. To this end, each of the monitoring clients 28 is shown to incorporate a publisher component 82.

As has been described above with reference to FIGS. 1-3, each of the application servers 14 is instrumented with a monitoring client 28, which communicates logging data messages utilizing a messaging API 30, these logging data messages being reported to a central logging system and to data analysis services. These messages may be communicated utilizing any one, or combination of, a number of well-known communications and messaging protocols (e.g., a transport protocol (e.g., TCP), a messaging protocol (e.g., utilizing a publish/subscribe messaging bus such as the TIB, developed by Tibco Software Inc., of Palo Alto, Calif.), or a network file sharing system (e.g., the NFS developed by Sun Microsystems Inc., of Santa Clara, Calif.)). The various exemplary embodiments of a system to monitor an application environment, and described with reference to FIGS. 1-3, show increasingly heavy deployment of a publish/subscribe messaging bus to facilitate communications between various components of a system. In certain applications, the use of a publish/subscribe messaging bus may allow components to broadcast and receive logging data messages in an efficient manner, and to allow components to have the ability to perform work in parallel, rather than in a serial manner. For example, rather than have a single component to receive a message, process the message, and then forward the original messages on to a downstream component, individual components may, utilizing a publish/subscribe message bus, be able to better utilize resources by concentrating solely on the local processing of received messages. The utilization of a publish/subscribe messaging bus architecture may also, in certain applications, enable scalability within a system by simplifying the action of adding a new hardware component. In its fullest implementation, a message bus 58 may allow a process or thread located anywhere within a system (e.g., the system 80) to be connected to the publish/subscribe bus, and to communicate with all other processes connected to the same bus.

Regardless of the messaging/communication protocol utilized to communicate, each of the monitoring clients 28, with which the respective application servers 14 of an application environment are instrumented, may communicate with a central logging system, and data analysis services, utilizing a generalized messaging API 30. This may provide certain advantages. For example, the unified and extensible logging of a set of diverse and heterogeneous applications may be enabled by instrumenting such application servers 14 utilizing monitoring clients 28 that communicate in a common syntax supported by the messaging API 30. Further, the common syntax supported by the messaging API 30 may provide for the simplified instrumentation of the application servers 14.

Figure 4:
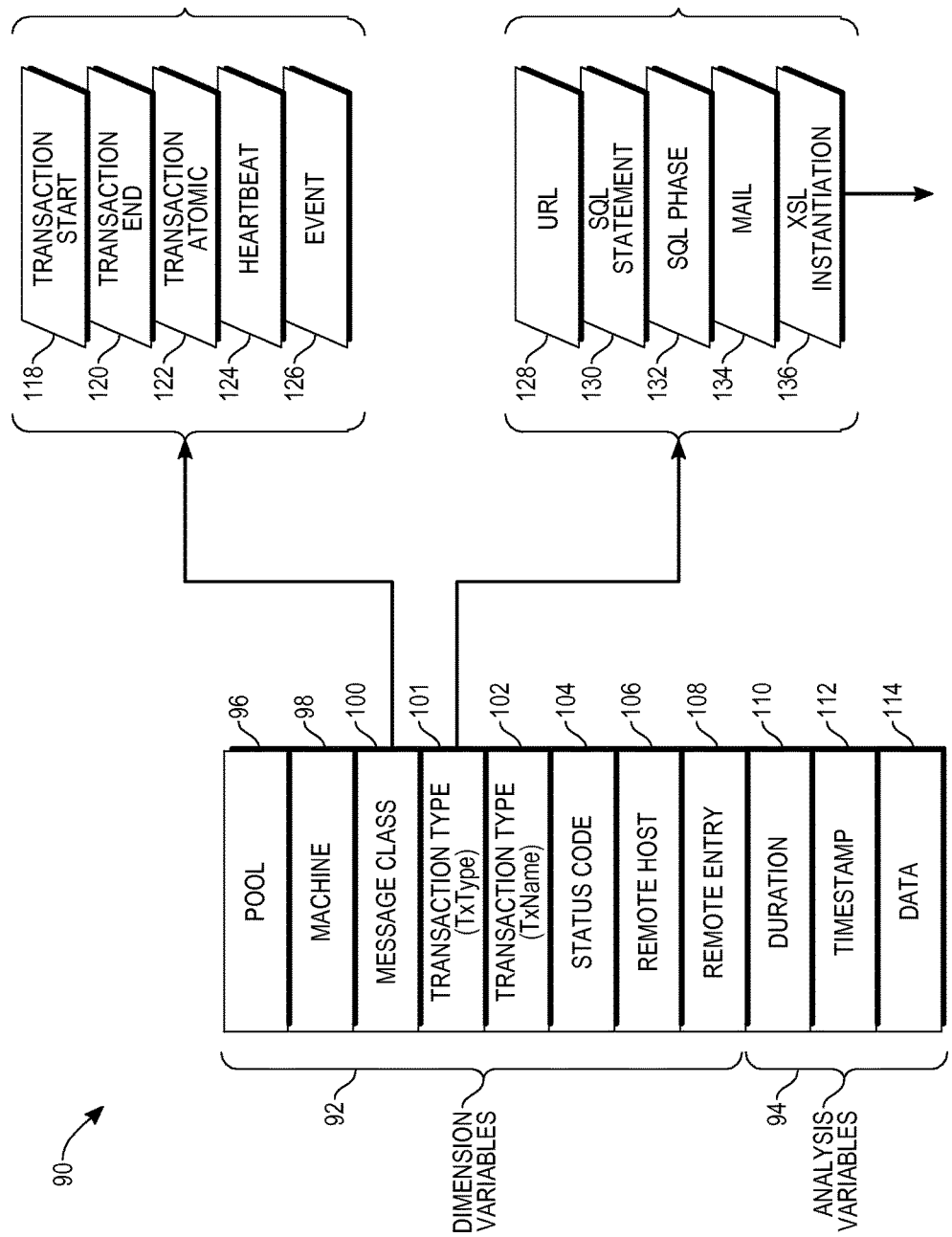
FIG. 4 is a diagrammatic representation of a data logging message, according to an exemplary embodiment, that may be generated by a monitoring client conforming to a messaging API.

FIG. 4 is a diagrammatic representation of a data logging message 90, according to an exemplary embodiment, that may be generated by a monitoring client 28, conforming to the messaging API 30. In the exemplary embodiment, a data logging message 90 is generated, by a respective monitoring client 28, for each observed transaction pertaining to a monitored application. Each monitoring client 28 may be adapted to monitor a specific application, or application type, within a diverse and heterogeneous application environment. Regardless of the diversity of applications monitored, each monitoring client 28 may utilize the messaging API 30 to communicate logging data messages conforming to a common syntax, such as that described below with reference to FIG. 4. For the purposes of the present specification, the term "transaction", to which a particular data logging message 90 may pertain, may be regarded as a flow of processing, or unit of work, that takes time to complete (e.g., has a start and an end).

Further, a transaction may optionally be regarded as either being successful or unsuccessful. Consider that if a transaction fails, an error code may identify the type of error that has caused the transaction to be unsuccessful. Further, each of the monitoring clients 28 may include a precision timer (not shown), which allows the monitoring client 28 to determine the time taken for a transaction to complete.

Transactions, monitored by a respective monitoring client 28, may furthermore be classified as being of a particular transaction type according to a predefined set of transaction types. For example, in one embodiment, a predefined set of transaction types may include URL, SQL, e-mail, XSLT, Logic, SQLOpen, SQLExe, and SQLFetch transactions, for example. Any number of transaction types may be defined.

Transactions may furthermore be nested. For example, an SQL transaction may be nested within a URL transaction and an XSLT transaction may be nested in an e-mail transaction, which is in turn nested in a URL transaction. For each transaction observed by a monitoring client 28, one or more data logging messages 90 may be generated.

Turning now specifically to the exemplary message 90 shown in FIG. 4, each message may include a number of fields. An exemplary syntax is provided below. A pool dimension variable 96 may indicate a pool 24 of application servers 14 from which the message 90 originated. Similarly, a machine dimension variable 98 indicates a specific machine (e.g., an application server 14) from which the relevant message 90 originated.

Each message 90 further includes a message class dimension variable 100 that, in the exemplary embodiment, identifies the message as belonging to one of five classes namely:
 1. A Transaction Start class 118;
 2. A Transaction End class 120;
 3. A Transaction Atomic class 122;
 4. A Heartbeat class 124; and
 5. An Event class 126.

Messages of the Transaction Start and the Transaction End classes 118 and 120 identify the start and end of transactions, as may be observed by a monitoring client 28 with respect to a monitored application. Messages of the Transaction Start and Transaction End classes 118 and 120 are normally utilized to report detected transactions or events pertaining to a particular transaction. Exemplary formats for messages of the classes 118 and 120 may be:

t <timestamp> <type>
//... nested messages
T <timestamp> <type> <name> <status> <duration> <data>.

As will be described below, in the event that no nested transaction messages are generated, a message of the Transaction Atomic class 122 may be generated. Messages belonging to the Transaction Atomic class 122 facilitate optimization of message communication and generation in that, if there are no other messages between a Transaction Start and a Transaction End, only a single message, of the Transaction Atomic class 122, is written. Accordingly, in one exemplary embodiment, the monitoring client 28 may perform a "lazy" evaluation of a transaction start, in that a message of the Transaction Start class 118 is only written if a subsequent event, pertaining to the relevant transaction, is registered prior to the transaction end. An exemplary format for a message of the Transaction Atomic class 122 may be:

A <timestamp> <type> <name> <status> <duration> <data>.

Messages of the Heartbeat class 124 may report statistical "heartbeats" concerning certain applications, the "heartbeats" being computed internally and logged at regular intervals. It will be appreciated that the statistics may be highly application dependent, or may be more general (e.g., percentage CPU utilization and percentage memory utilization). An exemplary format for a message of the Heartbeat class 124 is:

H <timestamp> <type> <name> <status> <data>.

Messages of the Event class 126 (Event Messages) are "catch all" messages for other types of messages that may not be transaction or heartbeat messages. As such, Event messages are for recording "instantaneous" and "aperiodic" actions. An non-instantaneous "event" may be more appropriately considered to be a Transaction. Likewise, a periodic action may be more appropriately considered to be a Heartbeat. One exemplary Event in the current embodiment is for acknowledging the detection of service Mark-Down. Information included within a message of the Event class 126 may include warning, error, exception or other types of internal data specific to a particular environment. The format of an exemplary message of the Event class 126 may be:

E <timestamp> <type> <name> <status> <data>.

A data logging message 90 may also include a transaction type dimension variable 101, which is a character string that stores information indicating the type of a particular transaction to which the message pertains. For example, where the heterogeneous application environment being monitored is supporting a website, the transaction type may identify the transaction as being of a URL type 128, a SQL statement type 130, an SQL phase type 132, an e-mail type 134, or an XSL instantiation type 136, to name a few examples.

A data logging message 90 may also include a transaction name dimension variable 102, which is a character string that further identifies the particular instance of the transaction type (e.g., for a URL transaction type, the specific URL function within an application, e.g. "ViewItem").

A status code dimension variable 104 may indicate the status of the logged transaction data (e.g., whether a transaction was successful or unsuccessful) and also a specific error that resulted in the transaction being unsuccessful, if this is the case.

A duration variable 110 stores information indicating a time (e.g., in milliseconds) that a monitored application spent executing a particular transaction. A timestamp variable 112 contains information indicating a time at which a relevant transaction may have started. Finally, a data variable 114 stores a list of name-value pairs pertinent to a monitored transaction (e.g., name=value & . . . & name=value).

As noted, certain of the variables within a data logging message 90 may be classified as dimension variables 92, whereas others may be classified as analysis variables 94. Specifically, dimension variables 92 may, in one embodiment, be utilized to aggregate data in different dimensions. Analysis variables 94, on the other hand, are simply aggregated across data sets determined by a dimensional analysis. Expressed differently, the "dimension" variables 92 may be regarded as identifying where in "space" certain data originated, and the analysis 94 variables encode values at points identified by the combination of the dimension variables 92. In one embodiment, a mapping (e.g., a function) may map a domain to a range. The domain may be defined as a vector space made up of the dimension variables (e.g. Pool, Machine, Message Class, Message Type, Message Name, Message Status, and also Message Time). The range may be defined as the analysis variables 94. Without any aggregation, the only visible analysis variable 94 may be Transaction duration, although the values in the data variable 114 portion of the message 90 may also include analysis variables 94 (which may require the inclusion of the names from the data as additional dimensional variables 92). An aggregation operation transforms this vector space, so that one or more dimension variables are dropped, but analysis variables are added. For example, aggregation can be performed in the time dimension by dropping the seconds and milliseconds dimensions, and adding analysis variables 94 Transactions per second, Average Transaction duration, Events per second, and Average Value per second for each Heartbeat, for example.

Figure 5:
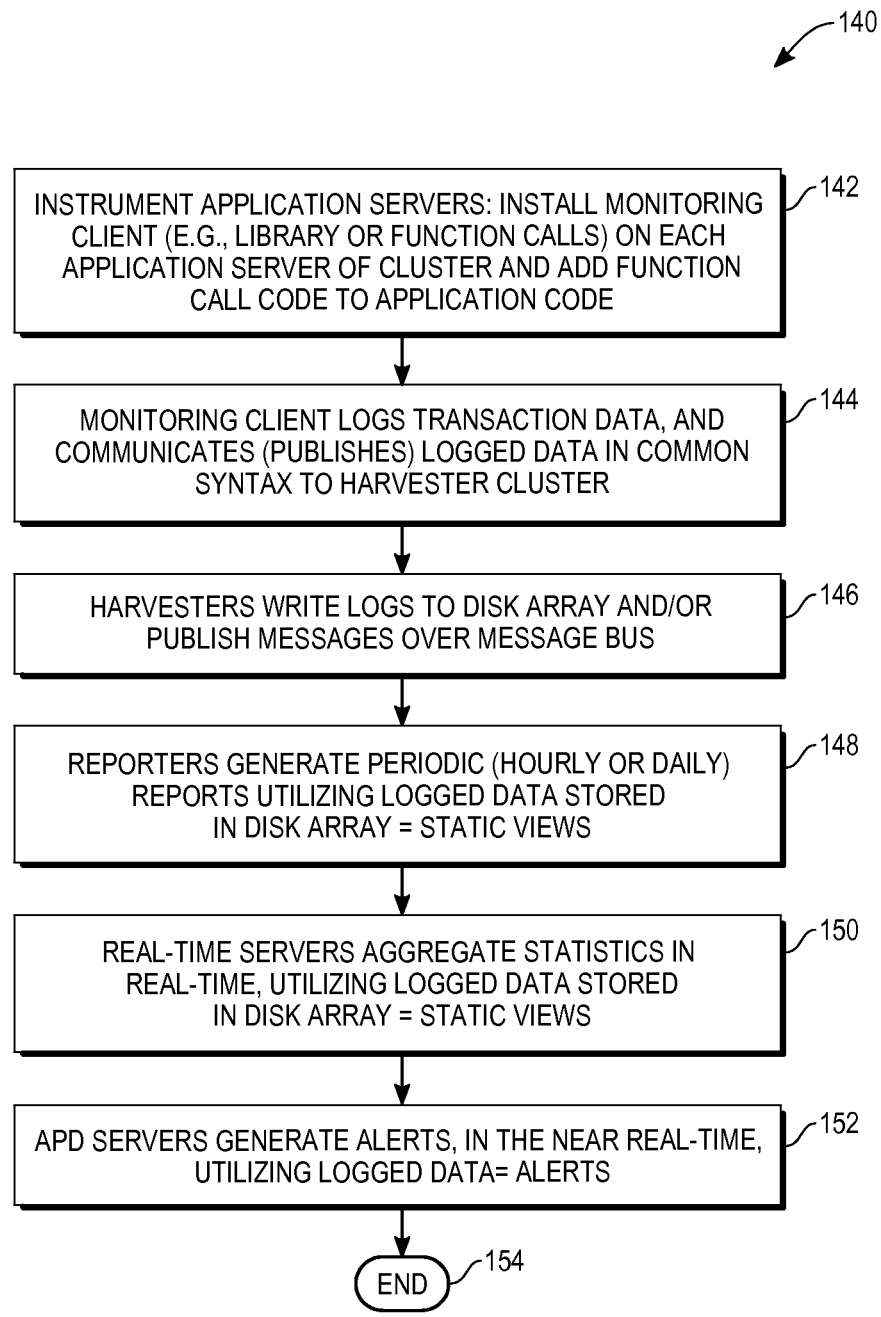
FIG. 5 is a flowchart depicting a method, according to an exemplary embodiment, to monitor a diverse and heterogeneous application environment.

FIG. 5 is a flowchart depicting a method 140, according to an exemplary embodiment, to monitor a diverse and heterogeneous application environment. The method 140 is described in the exemplary embodiment as being performed within the context of any one of the architectures described in FIGS. 1-3.

At block 142, an operator of the diverse and heterogeneous application environment instruments each application server 14 by installing a monitoring client 28 on, or making a monitoring client 28 available to, each application server 14, and also adding additional code to a monitored application to make function calls to a library of functions that may constitute the monitoring client 28.

Further details regarding interactions between an application server 14, and a monitoring client 28, according an exemplary embodiment, will now be discussed. In one embodiment, a monitoring client 28 may constitute a library of functions that are linked to a monitored application server 14. If no modifications or changes are made to an application server 14, then the functions within the relevant library are simply unused, and "monitoring" of the application server 14 by the monitoring client 28 may not occur. In one embodiment, each monitored application of an application server 14 (and/or the application server 14 itself) may be "instrumented" by the addition of code to the monitored application, in the form of calls to the library of functions that constitute the monitoring client 28. Calls to the library of functions result in messages being generated, packaged and sent from the monitored application server 14 and/or monitoring client 28 to the central logging and data analysis services 62.

According to an exemplary approach to logging, transactions may be regarded as being a particularly significant occurrence (or operations) to instrument. Key transactions to instrument may be so-called "entry point" transactions, and all "exit point" transactions. Consider that an application server 14 typically operates to provide a service. External applications, (e.g., a web browser, or a further application server in a multi-tiered enterprise architecture) may make requests to a particular application server 14. The application server 14 receives the request, performs an action and returns a response. The performed "action" or ("work") may be regarded as a transaction that can be instrumented. In one embodiment, such transactions may be labeled "root" or "level 0" transactions. Other transactions that an application server 14 executes are typically nested inside a "root" transaction. An application log (e.g., for one thread of execution in the application) may be recorded as a sequence of "root" transactions. Consider that, in a simple web server, the "root" transaction may be of the type URL. A billing application server, on the other hand, is typically not implemented as a web server and may accordingly not serve URL requests. Nonetheless, a billing application server will typically still have a main entry point, where it processes requests that might be called of type "billing." Several different kinds of billing requests may be served by an exemplary billing application server. For example, the billing application server might allow for the collection of payment from a user for the purchase of an item utilizing different payment methods. One billing transaction name might be, for example, "ChargeCreditCard," while another transaction name might be "ChargeCheckAccount". Any particular application server may have only one type of "root transaction," but this is not required.

In one embodiment, it may be desirable to instrument both an "entry point" transaction and all "exit point" transactions as noted above. An "exit point" transaction may be where a specific application server 14 utilizes the services of an external server (e.g., it takes on the role of a client in a different client-server transaction). An exemplary case is where an application server 14 makes use of an external database server (e.g., performs an SQL transaction). However, there may be many different kinds of "exit point" transactions. Continuing the above example, where an application server 14 makes use of an external billing application server, the relevant application server 14 will have an "exit point" transaction where it performs a call to the external billing application server 14.

In one embodiment, it may be useful to instrument both ends of a client-server transaction. Earlier, an "entry point" transaction was identified as potentially being regarded as a "root" transaction. Similarly, an "exit point" transaction may be regarded as a "leaf" transaction, and may appear in an application log as an atomic transaction. An exemption to this rule may be when a "leaf" transaction has an error of some kind that results in multiple "events" being logged. In such cases, the relevant "leaf" transaction would be logged as a non-atomic transaction.

As noted above, in one embodiment, transactions may be regarded as important occurrences, and application servers 14 may be instrumented at operation 142 accordingly. So-called "events" may, in one embodiment, also be regarded as important to log, and application servers 14 may also be instrumented to facilitate the logging of events. In one embodiment, events may be logged whenever there is a significant change of state, or when an error is detected at a location in code of an application server 14 that is not directly related to a particular transaction in progress.

Further, an application server 14 may be instrumented to log "heartbeats" when the logging of transactions may be prohibitively expensive. For example, where a number of memory allocations made per second, statistics about the size of memory allocation requests, and even an amount of time (in nanoseconds) that it takes to perform each memory allocation are of interest, it will be appreciated that the logging of each memory allocation would be prohibitively expensive for a resource and bandwidth computational perspective. While it would of course be possible to instrument memory allocation functions, and to perform aggregation and analysis of information so gleaned, the overhead costs associated with doing so may not be justifiable. Accordingly, for certain types of information, there are advantages to generating a "heartbeat" (e.g., once every second or once every minute) to facilitate the logging of this type of information.

At block 144, each of the installed monitoring clients 28 and/or application servers 14 logs transaction data and, utilizing the messaging API 30, and communicates the logging data in a common syntax to the cluster 16 of harvesters 18. In the exemplary system shown in FIG. 1, the logging data may be communicated as a data logging message 90 to a cluster of harvesters 18. Alternatively, in the system 80 shown in FIG. 3, the logging data may be published, as a logging message 90, by a monitoring client 28 utilizing a publisher 82, directly over a publish/subscribe messaging bus 58.

As noted above with respect to the description of the data logging message 90, each of the monitoring clients 28 may at block 144 monitor and log a wide variety of types of data, including origin information, in the form of pool and machine information, indicating an origin of the message 90, message class information, transaction name and type information, status information, duration information, timestamp information and other miscellaneous data. This data may then be formatted, according to the messaging API 30, as a message 90 conforming to a common syntax.

At block 146, the harvesters 18, having received the data logging messages 90, write logs into the disk array 38 via the network application server 42. The logs written into the disk array 38 are used by the reporters 44 to generate the static reports providing snapshot and historical information pertaining to the cluster 12 of application servers 14.

Accordingly, at block 148, the reporters 44, for example via a network 40, access the log information within the disk array 38, and generate periodic (e.g., hourly or daily) reports utilizing the logging data stored in the disk array 38.

The real-time servers 19, at block 150, aggregate statistics in real-time, utilizing messages received from the harvesters 18, as well as historical data retrieved from the disk array 38. The messages communicated from the harvesters 18 typically include the same information as contained in a data logging message 90; however, the formatting of such messages may vary in order to facilitate writing of the logging data into the disk array 38. Nonetheless, the real-time servers 19 are able to receive and process this information to generate the aggregate statistics in near real-time.

Similarly, at block 152, the Automated Problem Detection (APD) servers 60, described above with reference to FIGS. 2 and 3, utilize the logging data contained within the data logging messages 90 to detect actual and potential issues in near real-time, to generate alerts, and, where appropriate, to initiate preventative or corrective actions. Further details regarding the operation of an exemplary Automatic Problem Detection application 66 will be described in further detail below. The method 140 then terminates at block 154.

Figure 6:
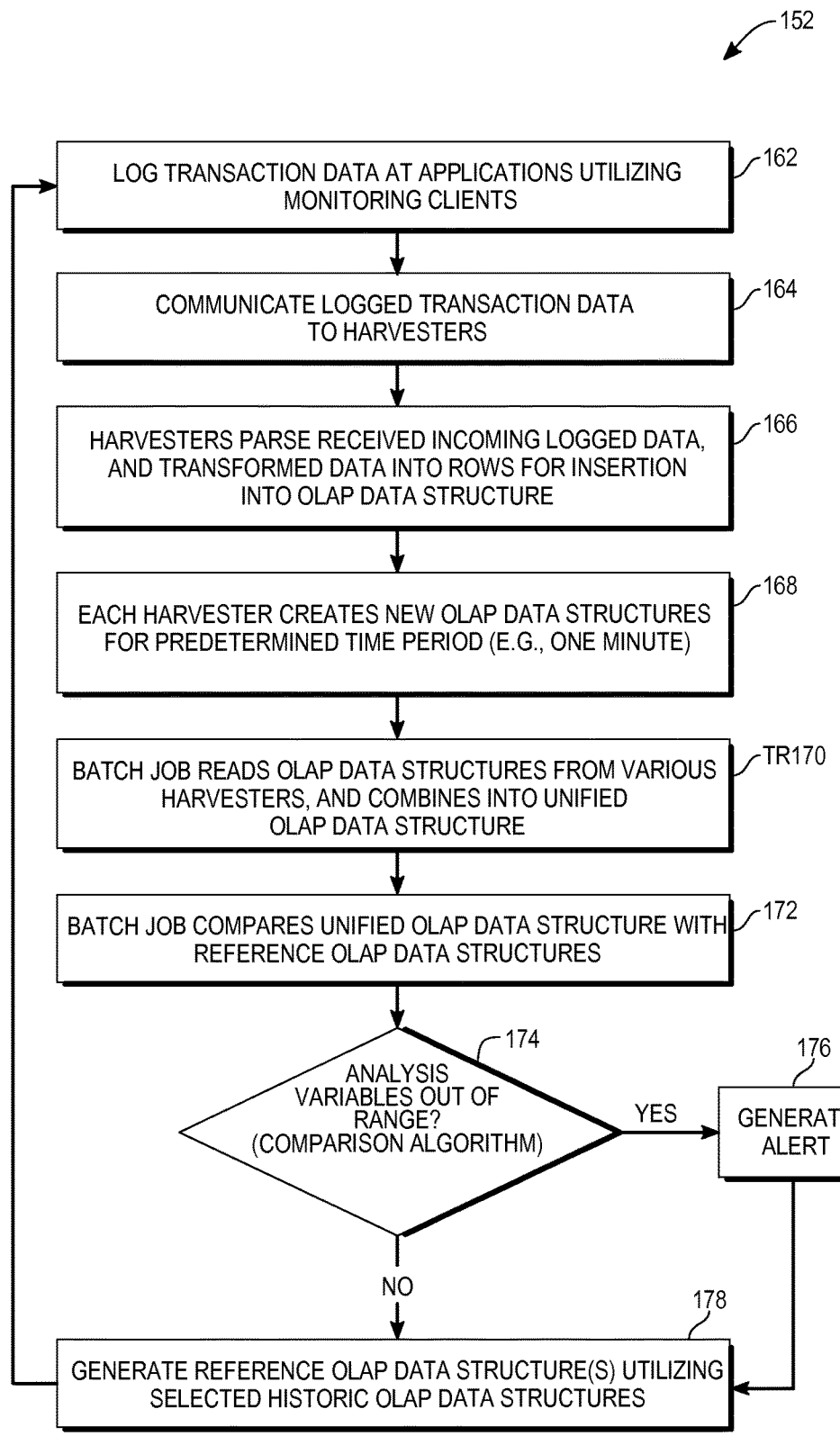
FIG. 6 is a flowchart illustrating a method, according to one exemplary embodiment, to perform automatic problem detection within a diverse and heterogeneous application environment.

FIG. 6 is a flowchart illustrating a method 152, according to one exemplary embodiment, for performing automatic problem detection within a diverse and heterogeneous application environment. At a high level, the method 152 comprises two phases running simultaneously in a pipeline, namely an aggregation phase whereby logged transaction data is aggregated, and an analysis phase wherein the aggregated data is analyzed. In one embodiment, the logged transaction data may be aggregated in a current time period (e.g., a current minute), while the analysis is performed on data aggregated with respect to a previous time period (e.g., a previous minute). The method 152 is furthermore performed, as noted above, by an Automatic Problem Detection application 66 executing on each of the APD servers 60, and the harvesters 18.

In one embodiment, the aggregation of the logged transaction data by the Automatic Problem Detection applications 66 may be viewed as transforming the logged transaction data into "heartbeats". The analysis, in this embodiment, performed by the applications 66 is done on the "heartbeats". Considering again the example in which aggregation is done on one-minute intervals, at the end of each minute, a set of statistics may be transferred to a drill-down analysis algorithm 70 to analyze. As the data is transferred once per minute, the data may thus be regarded as "heartbeat" data. The aggregation may therefore be viewed as occurring in the time dimension, in order to do the transfer to "heartbeats". However, the Automatic Problem Detection application 66 may also operate to aggregate in various "space" dimensions. For example, for each transaction time and for each pool 24, an Automatic Problem Detection application 66 may aggregate over all machines within a cluster 12 and produce "heartbeat" data such as, for example, the rate of transactions per minute per transaction type per pool, or the average transaction duration per type per pool.

In one embodiment of the Application Problem Detection application 66, the heartbeat information may be stored internally within a memory of an APD server 60, and thus not be encoded as "heartbeat messages" that are communicable on the publish/subscribe message bus 58. In alternative embodiments, an APD server 60 may support two tiers: a first tier responsible for the aggregation and the publication of "heartbeat" messages onto the message bus 58, and a second tier listening for "heartbeat" messages on the message bus 58, receiving such "heartbeat" messages, and performing analysis and alert functions utilizing data contained in such "heartbeat" messages. The above-described two-tier architecture may provide certain advantages in that it may provide improved scalability for higher volumes of traffic and, may also facilitate the dissemination of "heartbeat" data to other services beyond Automatic Problem Detection. Concerning the scalability of Automatic Problem Detection functionality, for a large application environment, a number of "aggregators" may be required, each aggregating only a subset of information received from a cluster 12 of application servers. Further, it may also be desirable to split the analysis function among various nodes according to analysis function. Of course, in one embodiment in which the two-tier approach is followed, the analysis may be performed in just one node of the second tier and, this one node performing analysis for all traffic (e.g., log transaction data transfer).

Regarding the availability of "heartbeat" information to other services, an example of such a further service may be the "real-time" analysis services provided by the real-time servers 19 that are shown in FIGS. 2 and 3 to be coupled to the message bus 58. In a single tier embodiment, the real-time servers may be required to also transform transactions (and events) into "heartbeats," thus duplicating operations that are also being performed by the Automatic Problem Detection applications 66. Where the APD servers 60 support a two-tier architecture consider the exemplary embodiment described above where the real-time servers 19 described herein wherein all information that is sent to the real-time servers 19 is in the form of one-second "heartbeats." Although the APD servers 60 are described as generating one-minute "heartbeats," the APD servers 60 may nonetheless be computing a wider range of statistics than the real-time servers 19. Accordingly, the two-tier architecture for the APD servers 60 may be utilized to consolidate certain aggregation operations that are then leveraged for above automatic problem detection purposes and for real-time report generation purposes. Of course, any number of other services may also subscribe to aggregate information generated. The method 152 described below provides one example of how the aggregation and analysis operations described above may be performed.

The method 152 commences at block 162 with the logging of transaction data at the various applications hosted on the application servers 14, utilizing the monitoring clients 28, as described above. The logged transaction data is then communicated by the monitoring clients 28, utilizing the messaging API 30, to the harvesters 18 and the APD servers 60. This communication of information may occur via any of the systems 10, 50 and/or 80 described above with reference to FIG. 3, for example.

At block 166, the harvesters 18 perform data analysis on the incoming logged transaction data. Specifically, the harvesters 18 perform limited real-time analysis on raw messages 90 with a view to transforming the raw data into rows of data that can be inserted into an Online Analytical Processing (OLAP) data structure, which for the purposes of the present specification is conveniently labeled as a "multidimensional cube". As noted above, the data logging messages 90 include both dimension variables 92 and analysis variables 94. Utilizing the messages 90, the harvesters 18 are able to create transaction tables 180. FIG. 7 illustrates an exemplary transaction table 180, including rows of transaction data suitable for insertion into an OLAP data structure that may be generated by the harvesters at block 166.

Moving on to block 168, each of the harvesters 18 then creates a new OLAP data structure for regular, predetermined time intervals (e.g., every minute), these data structures being referred to as multidimensional cubes, or more simply as "cubes". In one embodiment, a cube is formed as an in-memory data structure optimized for speed. Cubes may be written to disk and then later read back into memory but, in one embodiment, operations are performed on a cube only when in memory. Working with an in-memory data structure, it will be appreciated, places a limit on the number of rows that can be inserted into a cube but the cube data structure may take advantage of redundancy in data to achieve a high degree of compression.

At block 170, a batch job, forming part of the Automatic Problem Detection application 66, reads all of the cubes, created by the harvesters 18, for a predetermined time interval (e.g., one minute) and combines these cubes into a cluster-wide, unified cube (e.g., into a single cube for all data received from the cluster 12 of application servers 14) for the predetermined time interval. The creation of the unified cube (or OLAP data structure) should, in one embodiment, take less than the predetermined time interval for which the cubes are generated in order to prevent the batch job from falling behind in the creation of unified cubes.

At block 172, the batch job proceeds to compare the unified cube with reference OLAP data, in the exemplary embodiment termed a "range cube", so as to detect "out-of-range" deviations between the unified cube and the range cube. The range cube may be drawn from a predetermined number of previous cubes, different numbers of which may have been selected for different time periods. For example, the range cube may be generated utilizing an immediately previous 60 cubes representing activity within the cluster 12 of application servers 14 within the last hour, a second predetermined number of cubes from a prior week, plus a further predetermined number of cubes from two weeks prior etc.

The comparison of the unified cube with the reference OLAP data may include identifying analysis variables 94 (e.g., analysis variables that may be included within raw logging data, or analysis variables that are derived from information included within the raw logging data) for multiple dimension variables 92, or combinations of dimension variables 92, and determining whether the analysis variables 94 are within an acceptable range.

At decision block 174, the comparison algorithm 71 of the automatic program detection application 66 determines whether any of the analysis variables 94 are out of range. If so, at block 176, the automatic problem detection application 66 may cause the issuing of an appropriate alert and also possibly the initiation of preventative or corrective actions (e.g., human or automated actions). In the event that none of the analysis variables is out of range, the method 152 proceeds to block 178, where an updated reference OLAP data structure (e.g., a range cube) is generated utilizing selected OLAP data structures. The method 152 then loops back to block 162.

Further detail regarding comparison operations that may, in one exemplary embodiment of the present invention, be performed at block 172 will now be described. As will be appreciated, raw logging data may include a limited number of raw analysis variable information (e.g., transaction duration information, derived from a duration variable 110 of a data logging message 90). However, the summary node generation algorithm 68 of the automatic problem detection application 66 is able to derive further analysis variables 94, not necessarily included within a message 90, from the data included within a message 90. To this end, the summary node generation algorithm 68 may generate a collection of derived analysis variables 94.

For any given dimensional analysis (i.e., an analysis performed on any of the dimension variables 92), a summary table may be generated in which many transactions are summarized per row, based on a dimension variable. The degree of summarization may depend upon a hierarchy defined with respect to the transaction variables 92. For example, at a highest level of summarization, a simple table could indicate a total for a number of errors detected across an entire cluster 12 of application servers 14.

Figure 8:
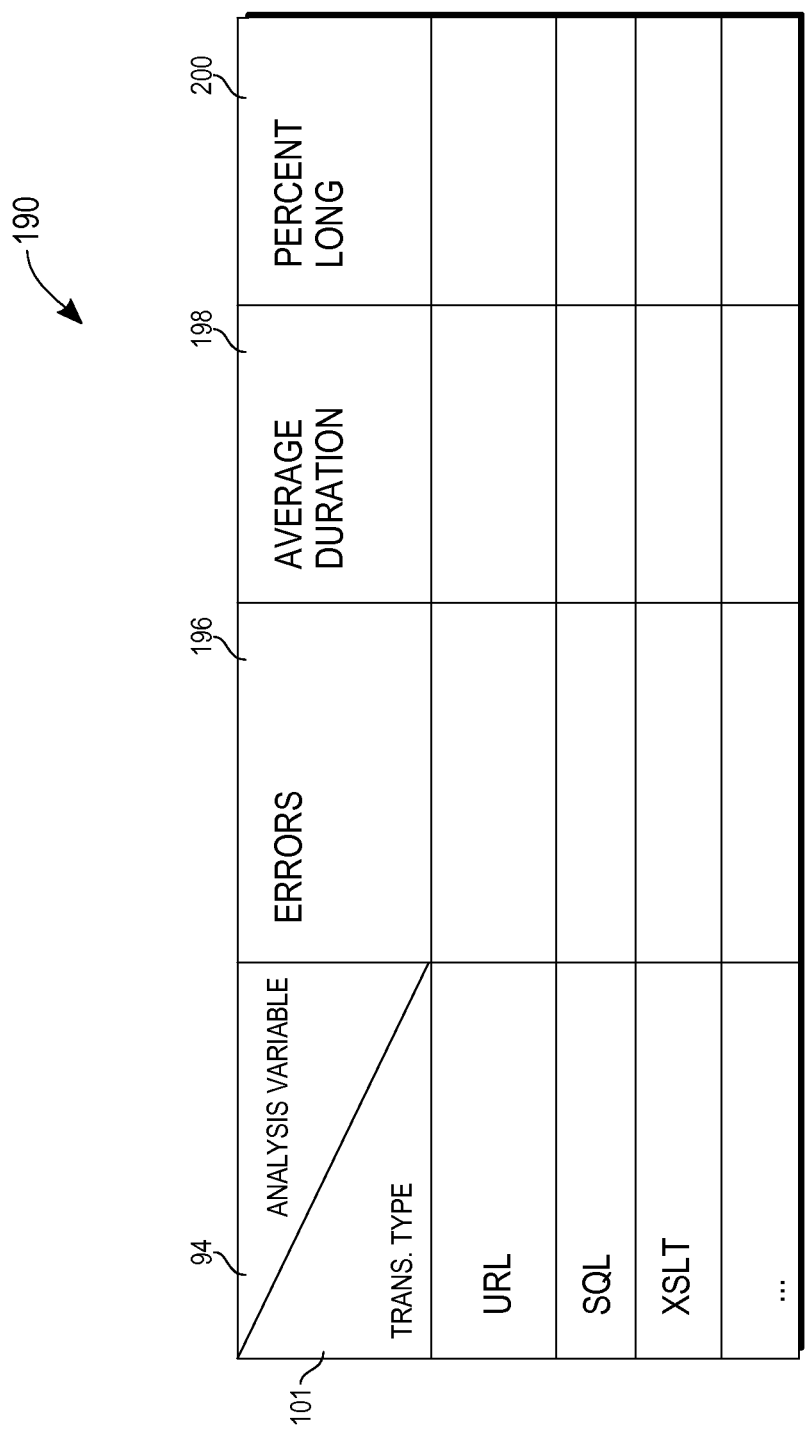
FIG. 8 illustrates an exemplary summary table that may be generated by a summary node generation algorithm for a dimensional analysis across a "transaction type" dimension variable.

FIG. 8 illustrates an exemplary summary table 190 that may be generated by the summary node generation algorithm 68 for a dimensional analysis across the "transaction type" dimension variable 101. The summary table 190 is also shown to include an error column 196, an average duration column 198, and a percentage long column 200, each of the columns 196, 198 and 200 being populated with derived analysis variables 94. It will, however, be appreciated that any number of summary tables may be generated, for different dimensional analyses, and each of these summary tables may include different analysis variables 94, either raw or derived.

Figure 9:
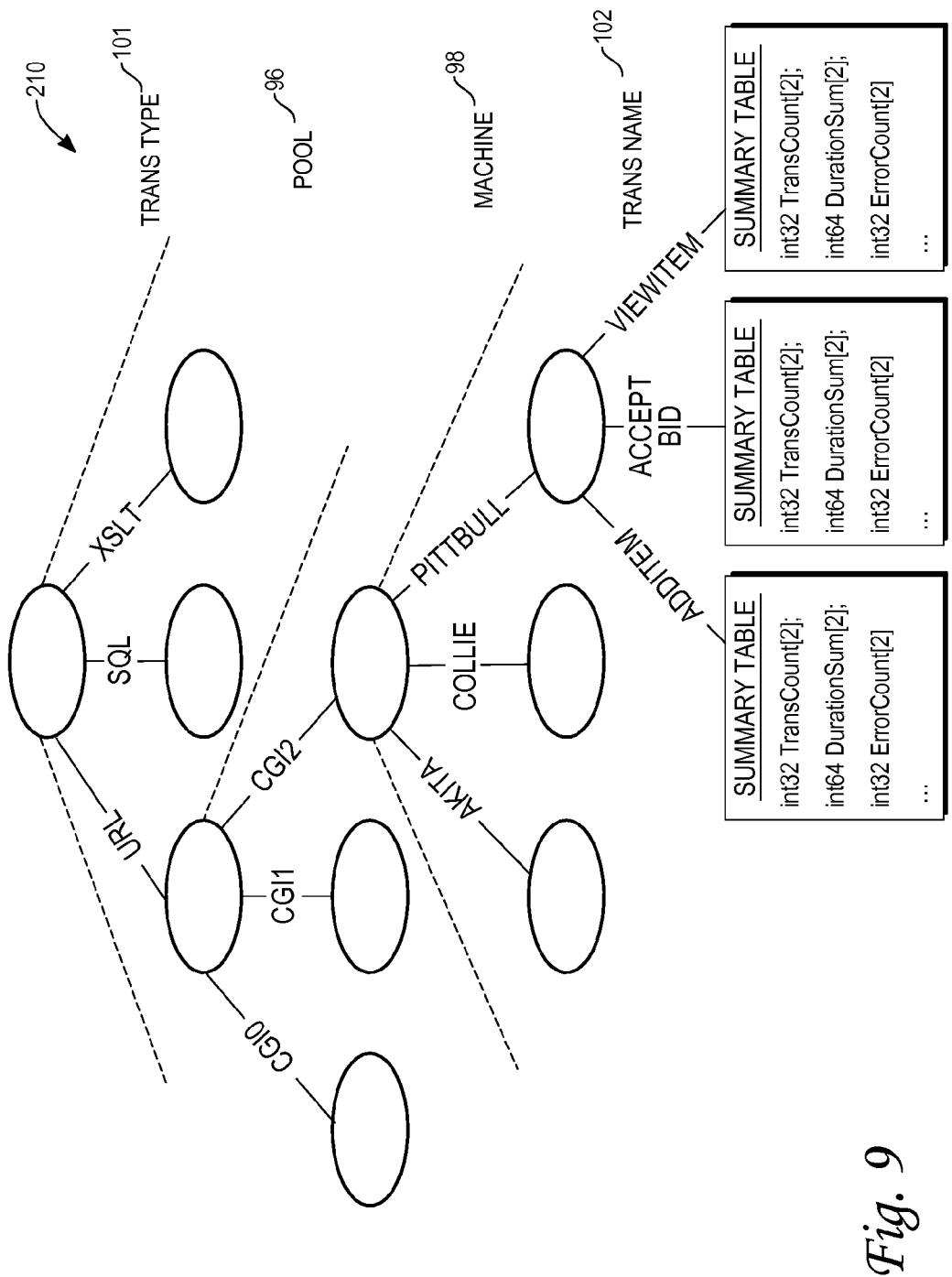
FIG. 9 is a diagrammatic representation of a dimensional hierarchy, according to an exemplary embodiment.

FIG. 9 is a diagrammatic representation of a dimensional hierarchy 210, according to an exemplary embodiment of the present invention. The dimensional hierarchy 210 is, in one embodiment, generated by the drill-down analysis algorithm 70 of the automatic problem detection application 66, and stored in memory (e.g., a Random Access Memory (RAM)), of an Automatic Problem Detection server 60. Depending on the type of drill-down analysis that may be required, the drill-down analysis algorithm 70 may generate any number of dimensional hierarchies (or trees) 210 to support an appropriate analysis. For example, in a further exemplary dimensional hierarchy 210, the transaction name dimension variable 101 may be connected to a root of the hierarchy 210, and any one of the dimensional variables may be regarded as a child of the transaction name dimension variable 101.

Turning to the exemplary dimensional hierarchy 210 shown in FIG. 9, the hierarchy 210 is shown to support a drill-down analysis through the transaction type dimensional variable 101, the pool dimensional variable 96, the machine dimensional variable 98, and finally the transaction name dimension variable 101. Each of the nodes within the dimensional hierarchy 210 may have one or more summary tables associated therewith, summarizing various analysis variables at that level of the hierarchy 210. The dimensional hierarchy 210, and the summary tables associated with each of the nodes, support an effective drill-down analysis of logging data generated by the monitoring clients 28 deployed within the cluster 12 of application servers 14.

As mentioned above, the summary tables 190, generated by the summary node generation algorithm 68 for each node of a dimensional hierarchy 210, may summarize logging data pertaining to a pre-determined time window or interval (e.g., a minute preceding a current minute in which the summary table 190 is viewable).

The unified OLAP data structure may be a "multi-dimensional cube", with all dimensions of the cube being regarded as independent and mathematically equal. Accordingly, an analysis, within the framework of a dimensional hierarchy, could be started utilizing any dimensional variable. The exemplary dimensional hierarchy 210 illustrated in FIG. 9 begins utilizing the transaction type dimension variable 101, but any of the dimension variables could be utilized as the start dimension variable.

Figure 10:
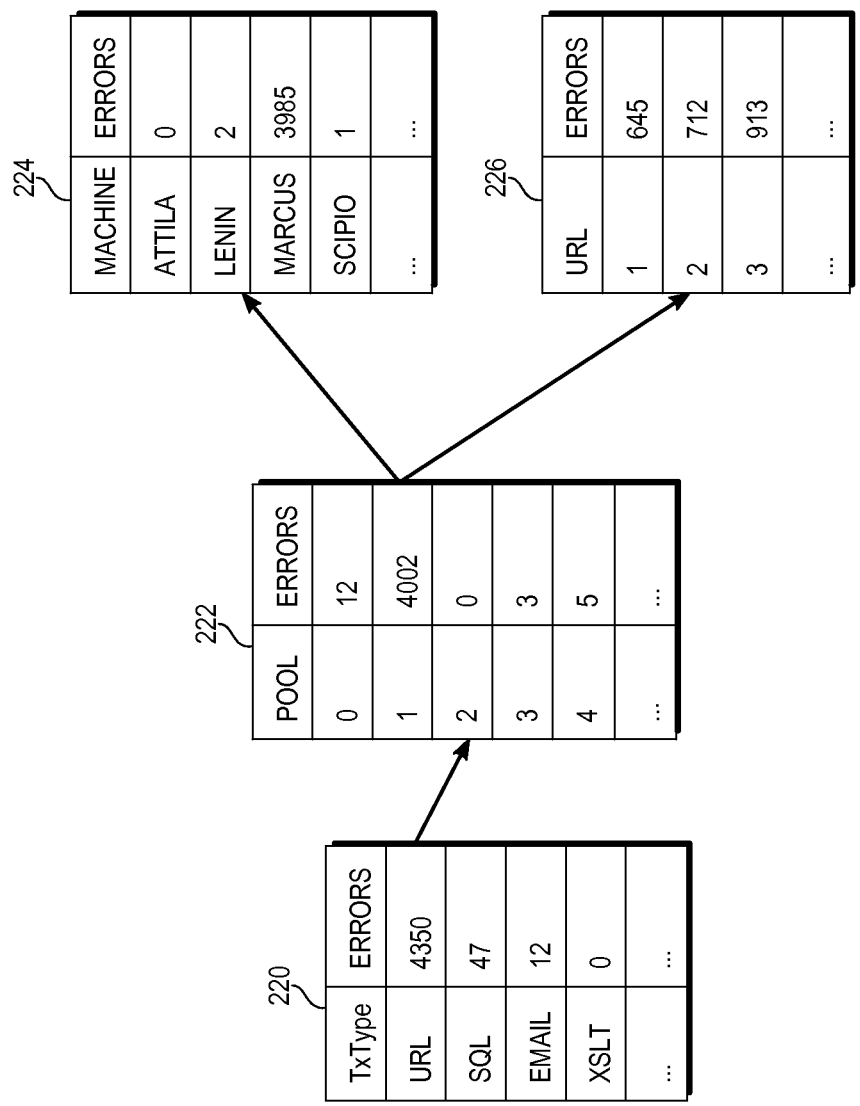
FIGS. 10-12 illustrates exemplary summary tables that may be presented to a user for analysis, or alternatively utilized by a comparison algorithm to perform a comparison against analysis variable thresholds content, for example, within a reference OLAP data structure for the purpose of detecting problems within a cluster of application servers.
Figure 11:
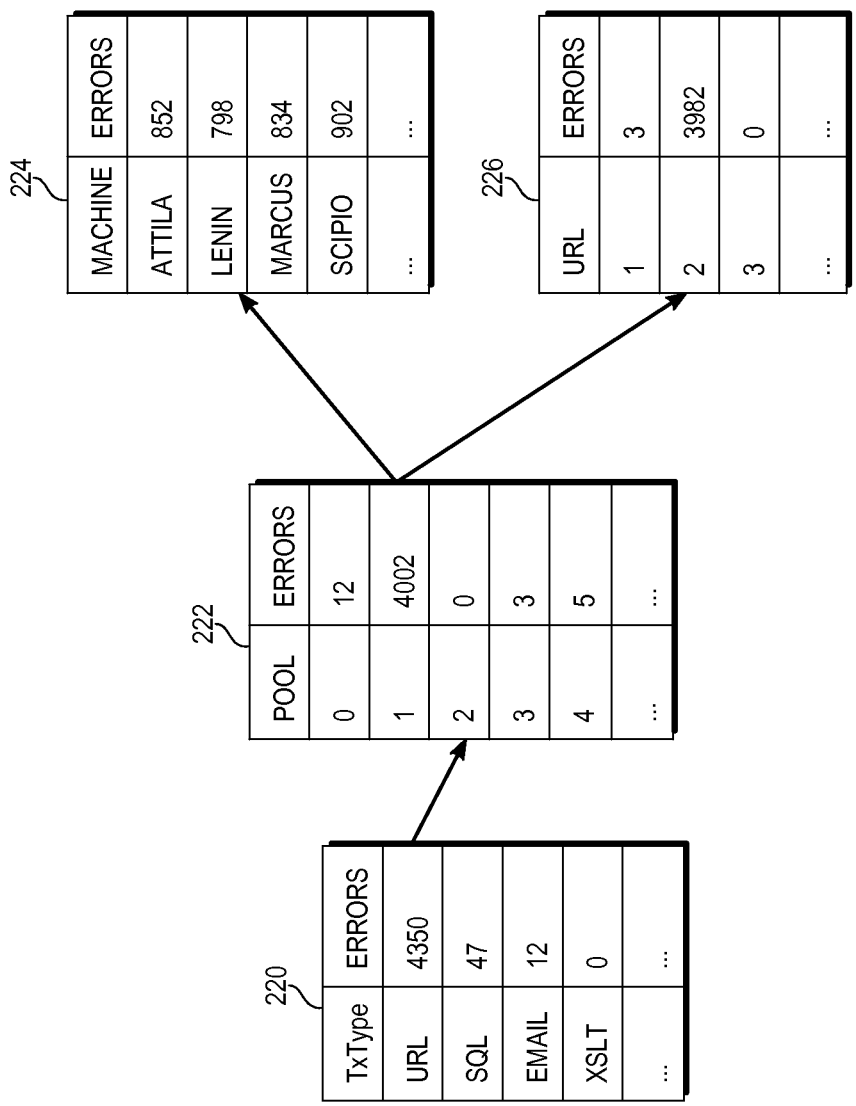
Figure 12:
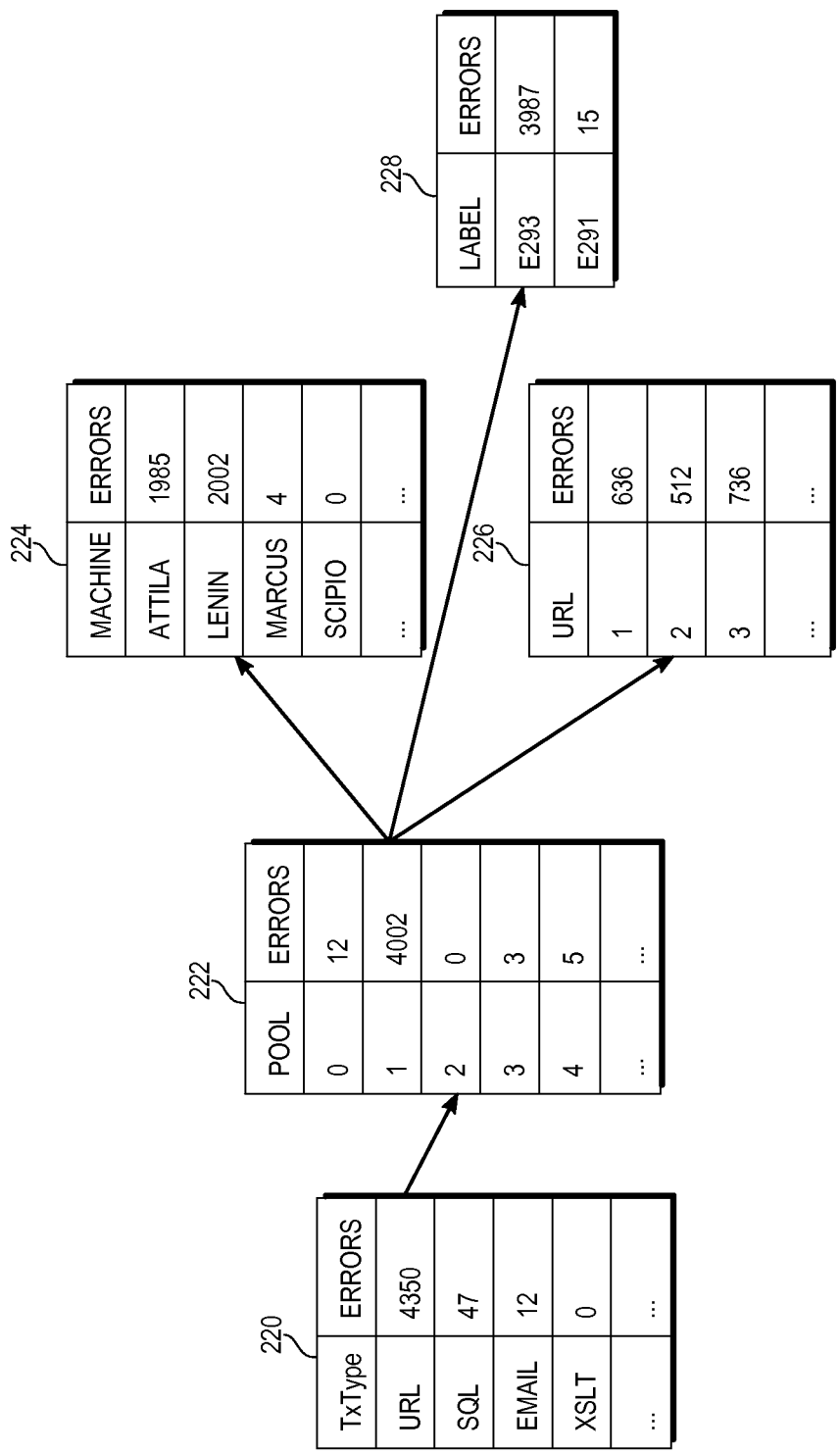

FIGS. 10-12 illustrates exemplary summary tables, which may be presented to a user for analysis or utilized by the comparison algorithm 71 to perform a comparison against analysis variable thresholds contained, for example, within a reference OLAP data structure (e.g., a range cube) for the purposes of detecting problems within the cluster 12 of application servers 14. The illustrated summary tables are generated by the summary node generation algorithm 68, and may, for example, support a drill-down analysis performed by the drill-down analysis algorithm 70.

Turning firstly to the exemplary set of summary tables shown in FIG. 10, assume that a unified OLAP data structure has been generated, the unified OLAP data structure embodying logging data reflecting activities within the cluster 12 within a preceding time period (e.g., a minute). Failed transactions are a clear indicator of problems within the cluster 12, and may be indicated by non-zero values within status code dimension variables 104 of data logging messages 90. The summary node generation algorithm 68 creates a derived analysis variable, in which is counted the number of transactions in which the status code variable is non-zero. It will be appreciated that this count provides an indication of the number of errors encountered within the cluster 12. To determine whether a count of unsuccessful transaction is problematic, the count total may be compared to minimum and maximum values within the reference OLAP data structure to determine whether the count is within an acceptable range.

Consider the example in which the reference OLAP data structure indicates that a total count of 2,000 errors within the cluster 12, within a minute, is acceptable, but that if the number of errors exceeds this maximum threshold, a problem may exist. Turning specifically to FIG. 10, it will be noted that the summary table 220 indicates that the number of errors, across all transaction types, within the cluster 12 exceeds 4,000. Clearly, in this example, a problem exists for the monitored minute, and the drill-down analysis algorithm 70 will then proceed to perform a drill-down analysis with a view to identifying the specific problem and potentially to initiate a corrective action.

Having determined that the total number of errors within the cluster 12 for the monitored minute exceeds a threshold, the drill-down analysis algorithm 70 may then expand the dimensional analysis by looking at the table 220, which indicates that the bulk of the detected errors occurred with respect to a URL transaction type. A comparison may again be performed with respect to the reference OLAP data structure to determine that the number of errors pertaining to URL transactions falls outside of an acceptable range. The drill-down analysis algorithm 70 now continues the analysis to determine more specifically where the problem lies. A drill-down into the URL row of the summary table 220 reveals the summary table 222, which indicates that by far the majority of the errors pertaining to the URL transaction have arisen with respect to machines in pool 1. Again, the drill-down analysis algorithm 70 will utilize the reference OLAP data structure to identify the errors pertaining to the URL transactions within pool 1 as falling outside an acceptable range, and then drill-down on the row for pool 1 within the table 222, to reveal the summary tables 224 and 226. The summary table 226, when analyzed by the drill-down analysis algorithm 70, reveals that the errors are not being generated disproportionately by any of the URL transactions being serviced by the machines in pool 1. However, the summary table 224 reveals that the machine "Marcus" in pool 1 is experiencing a hugely disproportionate number of errors for URL transactions. Accordingly, the drill-down analysis algorithm 70, on an analysis of the table 224, may generate an alert to a human administrator, or to an automatic maintenance program. For example, the automatic maintenance program may, responsive to the alert, shut down the errant machine "Marcus", or configure the clusters 12 so that URL transactions are diverted away from the machine "Marcus" (e.g., by appropriate configuration of a load balancer 26). Further, the drill-down analysis algorithm 70 may perform further analysis with respect to the machine "Marcus", to find an even more specific description of the problem. For example, a drill-down into the machine "Marcus" could be performed and an expansion on the status code dimension variable performed to reveal further details. For example, various status codes may provide further information regarding the nature of errors encountered. The drill-down analysis algorithm 70 may then provide a count of the number of status codes of each type received (e.g., 3500 status codes 391 received, 200 status codes 415 received, etc.).

FIG. 11 illustrates a drill-down analysis, (for example performed by the drill-down analysis algorithm 70 or a human operator) in which the observed errors pertaining to URL transactions are not caused by the machine "Marcus", but instead by a specific URL transaction (i.e., URL 2). Specifically, the summary table 224 reveals that the errors are uniformly distributed across all machines in the pool 1, but that the observed problem is entirely specific to URL 1. From the URL 2 row in the table 226, a further drill-down may be performed and an expansion by status code may be performed to determine if the errors are due to one specific error, associated with a specific status code.

FIG. 12 illustrates a drill-down analysis, responsive to an observation that the number of URL transactions exceeds a threshold, in which a URL error storm is not specific to any URL transaction type, and is distributed across two machines "Attila" and "Lenin". In this case, a specific build "E293" is identified as causing the URL storm.

As noted above, the drill-down analyses illustrated in FIGS. 10-12 may be performed by a human operator, or may be automated and performed by the drill-down analysis algorithm 70. In the case where the analysis is performed by a human operator, a graphical user interface may present the various summary tables to the human operator, with each of the rows of the tables being selectable (e.g., being a URL) to be expandable to generate a more focused summary table. To this end, a human operator, by selecting rows within tables, may navigate a dimensional hierarchy 210 such as that shown in FIG. 9, to identify the source of an observed problem. In the case where the analysis is performed in an automated fashion by the drill-down analysis algorithm 70, the algorithm 70 may similarly navigate through a dimensional hierarchy 210 and perform various dimensional analyses with a view to pinpointing a source and/or cause of an observed problem or issue. For example, considering the drill-down analysis reflected in FIG. 11, the algorithm 70 may drill-down to the summary table 224, observe that the errors are somewhat uniformly distributed across all machines within a particular pool, and based on this observation, determine that a further dimensional analysis (e.g., with respect to specific transaction names) is required. The summary node generation algorithm 68 may then generate the further summary table 226 on which a comparison operation, with respect to the reference OLAP data structure, is be performed.

Expanding upon the alert generation operation performed at block 176 in FIG. 6, the automatic problem detection application 66 operates to determine the root cause of an observed problem, and then proceeds to report the problem. Further, the automatic problem detection application 66 may, in one embodiment, determine the cause of a particular problem. For example, the application 66 may make an assessment as to whether the problem is being caused by a hardware failure, or a software bug. If the problem is identified as a hardware problem, the application 66 may furthermore identify the hardware problem as pertaining to RAM, a hard disk, a network interface, etc. This information may be determined based on the status codes pertaining to errors observed by the drill-down analysis algorithm 70, and included in a report (or alert) that is generated. The reports or alerts generated at block 176 may furthermore be sent to an event correlator (not shown), which operates to correlate events with events that may have been observed by other monitoring systems, the event correlator then providing output to a human operator.

An alert that is presented to a human operator may also identify sources for the error that have been ruled out. For example, an alert may be presented as follows:

"Problem with machine "Marcus" in pool 1: Exceeded the acceptable range of URL errors. The problem is not present in other machines in pool 1. The problem is not a database problem".

The alert text may also be hypertext-linked, so that text within the alert is user selectable to provide specific information. For example, the text "Exceeded the acceptable range of URL errors" may be hypertext-linked to generate a summary table that provides a count of the number of URL errors observed on the machine "Marcus". Similarly, the text "not present in other machines in pool 1" may be hypertext-linked to present the table 224, illustrated in FIG. 10, to a human operator. Further, the text "not a database problem" may be hypertext-linked to present the table 226 to a human operator.

As noted above, the dimensional hierarchy 210 shown in FIG. 9 illustrates merely one manner in which a drill-down analysis may be performed. It will be appreciated that other dimensional hierarchies may be generated to support an alternative drill-down analysis.

Expanding on the generation of the reference OLAP data structure, described above with reference to block 178 of FIG. 6, the reference OLAP data structure may be derived from a sample of many older OLAP data structures that provide an historic perspective on a "normal" state for the cluster 12. The reference OLAP data structure enables a determination to be made whether a specific analysis variable is within a "healthy" range, for a specific selection of dimension variable. In addition to a simple "yes/no" answer, the reference OLAP data structure also enables an assessment of whether a specific analysis variable is too high or too low.

In one exemplary embodiment, the reference OLAP data structure may be generated to provide context to a given time, day or date. A different reference OLAP data structure may be generated for each of the 160 hours of a week, for example. In another embodiment, the reference OLAP data structure may be continually updated so that it is always appropriate for a particular time, day or date. Specifically, the reference OLAP data structure that is utilized for the comparison operation performed at block 172 of the method 152 shown in FIG. 6 should be representative of a "healthy" state for a monitored system, at a particular time, day and/or date. Considering the exemplary embodiment in which a unique reference OLAP data structure is generated for each of the 160 hours of a week. A 1-minute reference OLAP data structure for up to one hour in the past (for a particular day) may be representative but an OLAP data structure two hours in the past may not be representative. Further, a 1-minute reference OLAP data structure for a current hour one or two weeks in the past may be representative, but an OLAP data structure for a current hour one or two days in the past may not be representative.

In one embodiment of the present invention, a new reference OLAP data structure (e.g., a range cube) is created every minute. The reference OLAP data structure may be created by drawing on a prior 60 minutes of activity (e.g., providing a potential sample of 60 OLAP data structures). Further, OLAP data structures for one week in the past, and allowing for plus or minus one hour, increases the potential sample to 121 further OLAP data structures. Going back two or more weeks in the past increases the sample by a further 121 OLAP data structures per week. In one embodiment, one month's worth of reference OLAP data structures may be retained, thus providing more than 858 representative OLAP data structures from which may be sampled.

Having identified a set of potential sample OLAP data structures, data structures that correspond to past system problems are discarded (e.g., only representative "healthy" OLAP data structures are used). To this end, the automatic problem detection application 66 may flag unified OLAP data structures as either being "healthy" or "unhealthy", depending on whether a problem was detected within the relevant predetermined time interval (e.g., 1 minute). In one embodiment, the final flagging of a unified OLAP data structure as "healthy" or "unhealthy" may be subject to human confirmation. For example, the automatic problem detection application 66 may register a problem within a specific minute, but upon further human investigation the problem is determined in fact to represent a false positive. In this case, a human operator may flag the relevant unified OLAP data structure as being "healthy", not withstanding that a problem was reported by the automatic problem detection application 66.

In yet a further embodiment, an assumption may be made that a reference OLAP data structure for one minute only exhibits minor differences from a reference OLAP data structure for the prior minute. This assumption may be factored into the determination of the health of a reference OLAP data structure for a particular minute, utilized to dampen the effects of any abnormal activities present in the other sample data, and also to account for changes with respect to the system over the sample period. For example, where a sample set extends one month into the past, system changes may have occurred that influence what may be regarded as a "healthy" state for a system. A significant number of machines may have been added to a particular machine pool within the one month period, which may substantially influence the reliability and value of samples prior to this system modification. Accordingly, the reference OLAP data structure from the preceding minute may be weighted in the calculation of the reference OLAP data structure so as to allow the current state of a system to more strongly influence what is considered to be a "healthy" state.

The influence of time, date and/or day may be particularly significant where the system being monitored is a website. Specifically, activity on a particular website may display significant variations, based on time, day and/or date. For example, where the website supports a commerce system, there may be specific times of the day in which transaction activity displays significant increases, and also specific days on which transaction volume is significantly higher than on other days. Further, transaction activity may increase as a specific calendar event (e.g., the Christmas holiday season) approaches. By a selection of the sample reference OLAP data structures, from which a current reference OLAP data structure is calculated, for corresponding past times, or time periods, and also by factoring in immediately past reference OLAP data structures, one embodiment of the present invention seeks to provide a current reference OLAP data structure that provides an accurate representation of a "healthy" state for a monitored system, such as the cluster 12 of application servers 14.

In various embodiments of the present invention, the unified OLAP data structure may also be configured to have different resolutions. For example, the reference OLAP data structure may be provided with an error code level resolution, whereas in another embodiment, a reference OLAP data structure may be provided with a higher resolution (e.g., at a pool level).

Figure 13:
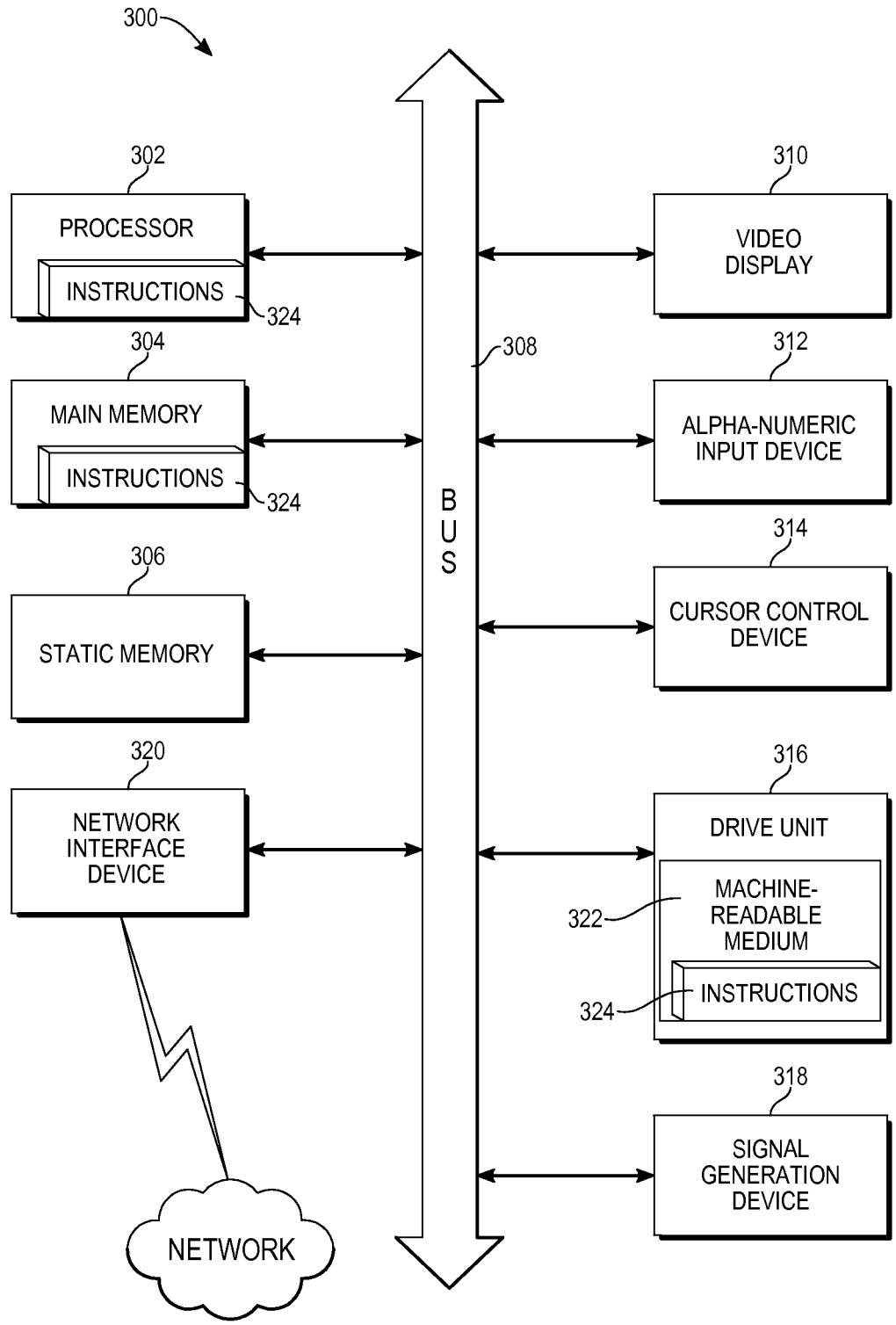
FIG. 13 is a diagrammatic representation of a machine, an exemplary form of a computer system, within which a set of instructions, for causing the machine to perform any one of the methodologies discussed herein, may be executed.

FIG. 13 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 392 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Figure 14:
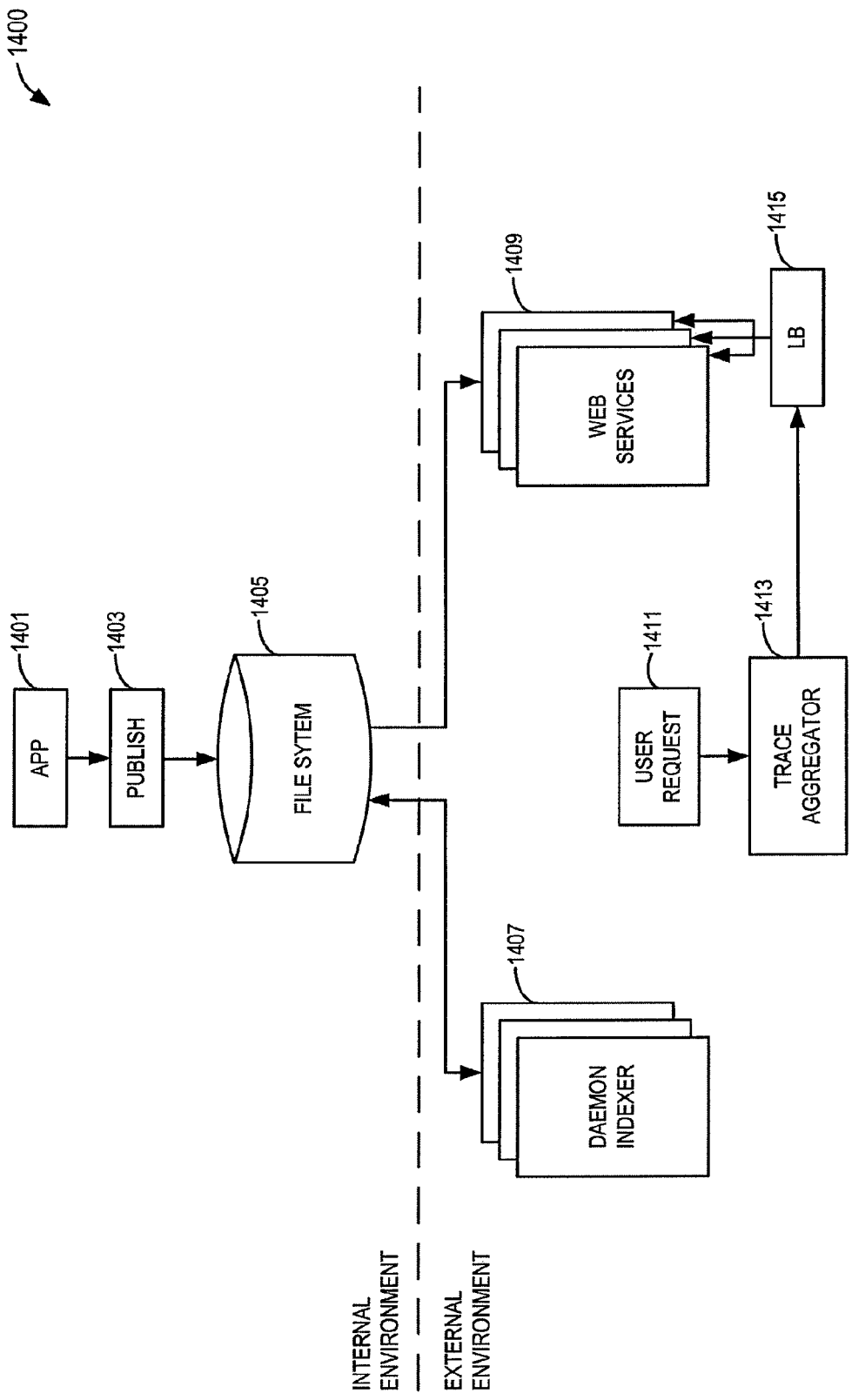
FIG. 14 is a diagrammatic representation of an example system for real-time data capture and organization of the data using a non-server based data system.

Referring now to FIG. 14, a diagrammatic representation of an example system 1400 for real-time data capture and organization of the data using a non-server based data system is shown. In various embodiments, the system 1400 uses one or more indexers to read transactional data in real-time or near real-time as the data are produced and then write an organized version of the data back into a non-server based data repository or file system. The data may be organized by time, space (e.g., geography), and functionality. Of course, a skilled artisan, upon reading the disclosure set forth herein, will recognize that the data may be sorted by a number of other operational, user, or application metrics as well. Each of these concepts is discussed in more detail, below.

In the context of the system 1400, the term "real-time data capture" does not necessarily refer to instantaneous data capture or even rapid data capture. As is understood by a skilled artisan, "real-time data capture" generally refers to capturing or organizing data generated by a system or systems within reasonable time delays (e.g., substantially real-time) as propagated by various transmission mediums including, for example, electronic delays, broadcast delays, Internet delays, and a host of other delays and factors to which the data are subjected. Moreover, the amount of data available on the various systems described herein is enormous with potentially hundreds of terabytes of data storage being acquired and tens of billions of transactions occurring per day. Regardless, sub-minute latencies may be achieved in which the data are organized or sorted and made available for subsequent query. The transactional data may be obtained from, for example, the cluster 16 of the harvesters 18 discussed above with reference to FIG. 1.

The example system 1400 is shown to include components in an internal environment and an external environment. The internal environment may refer to, for example, a service-level agreement (SLA) environment, in which other operations (e.g., client billing) also may take place. The internal environment can refer to, in an example, an electronic commerce-based marketplace. The internal environment may be replicated, in whole or in part, in various geographic locations around the world. The external environment may take place in a cloud or at other facilities outside of or remote from the internal environment. Moreover, the separation between the internal environment and the external environment is arbitrary and is shown simply as one example of how the system 1400 may be arranged. A person of skill in the art will readily recognize that the various components may readily be located in alternate environments other than those shown. For example one or more load balancers 1415 and a trace aggregator 1413 may be located within the internal environment. Similarly, a file system 1405 may be located in an external environment.

With continuing reference to FIG. 14, the system 1400 is shown to include an application module 1401, a publish module 1403, and a file system 1405. A skilled artisan will immediately recognize that the term "module" may be implemented in, for example, various pieces of hardware such as the computer system 300 or the processor 302 of FIG. 13. The system 1400 is further shown to include a daemon indexer module 1407, a web services module 1409, the trace aggregator 1413, and the one or more load balancers 1415.

In an embodiment, the application module 1401 may be similar to and serve similar or the same functions as the application server 14 of FIGS. 1 and 2. Recall that the application server 14 may be located or function in a diverse heterogeneous application environment, according to various embodiments. The monitored application environment may, for example, include a large number of applications, with each application hosted on a respective application server and providing distinct application services. The diverse heterogeneous application environment may, for example, include applications providing, at one end of the spectrum, unrelated and distinct services, or may include applications that provide distinct but partially or directly related services (e.g., purchase process and billing services).

In an embodiment, the publish module 1403 may be similar to and serve similar or the same functions as the publish/subscribe messaging communications system 50 of FIGS. 2 and 3.

The file system may be similar to, for example, the disk array 38 of the central logging and data analysis services 62 of FIG. 2. Consequently, in example embodiments, the system 1400 may utilize the same or similar underlying data as collected by the various systems described with reference to FIGS. 1 and 2. However, in various embodiments, a goal of the system 1400 is to provide a widely scalable and cost-effective means to index and allow querying of large amounts of transactional data in real-time.

The daemon indexer 1407 may perform read/write operations with the file system 1405. For example, the daemon indexer 1407 may read transactional data from the file system 1405 as the data are produced, parse the transactional data, and create context for the data. "Useful" data derived from the transactional data may then be indexed and stored. "Useful" data may be separated into at least two categories such as operational data and business-related data. Operational data can include IP addresses, errors occurring within the system, warnings generated by the system 1400, and so on. Business-related data can include calls for customer support, organizational or support questions, inquiries about payments not being transmitted properly, and other operational characteristics of the data. The useful data can be configurable. For example, a determination can be made as to which of the transactional data are needed to be retained by the system 1400 for access from the daemon indexer 1407. Also, indexed items may be referenced together in certain ways to produce richer search results. For example, the terms "user," user ID," and "UID" can all be flagged as being synonymous to one another. Thus, when a user request 1411 searches for a "user," the system will concurrently search for terms related to "user ID" and "UID" as well.

The useful data, once selected, may be partitioned by time, space, and functionality. For example, the data may be indexed and stored on a real-time basis, by a particular time parameter (e.g., date and time of day), by a particular function (e.g., a search), and by space (e.g., a geographic space such as Norway). In a specific example embodiment, the time, space, and functionality data may be stored on the file system 1405 as:

SJC/2011/06July/14:23:00/Myebaycore/database where "SJC" is the space or geography (San Jose, Calif.), "2011/06July/14:23:00" is the date and time of day, "Myebaycore" is the function, and "db" relates to a data file. The arrangement of the data file by time, space (geography), and functionality provides for a fast response to data queries. Thus, the system 1400 allows an in-line write of index values to a data store (e.g., the file system 1405).

In an example embodiment, the daemon indexer 1407 is a serverless and self-contained database engine. Although the useful transactional data could be written to a relational database, the data involved here are not relational. Also, relational databases are expensive and are not readily scalable. However, the daemon-indexer 1407 and the file system 1405 can function entirely as a non-relational data repository since the useful data are not relational data (discussed in more detail, below). Thus, the file system 1405 may be comprised of standard storage (e.g., disk arrays). Standard storage is inexpensive and highly scalable. As more capacity is needed, additional storage is simply added.

Moreover, since the daemon indexer 1407 is self-contained, the indexer requires minimal support from, for example, external libraries or from one or more operating systems. Further, being serverless, both the file system 1405 and the user request 1411 (discussed in more detail, below) can access data on the file system 1405 from the files on the disk. There need not be a separate intermediary server process involved. As a result, the file system 1405 and the daemon indexer 1407 can be expanded (e.g., made readily scalable) quickly at little added cost (e.g., cost-effective) since neither the file system 1405 nor the daemon indexer 1407 require server processes or extensive configuration. Additionally, since there is no separate server process to install, configure, or troubleshoot, there is little need for extensive administrative or technical support for setting up the file system 1405 or the daemon indexer 1407. Any program that is able to access disks (e.g., disk arrays) is able to access both the file system 1405 and the daemon indexer 1407 (directly or indirectly, as discussed in more detail, below).

In one specific example embodiment, the daemon indexer 1407 may contain a non-relational data engine. For example, in a specific example embodiment, the database engine may run under SQLite. SQLite is a software library that implements a self-contained, serverless, zero-configuration, transactional SQL database engine. SQLite is available for direct licensing from Hipp, Wyrick & Company, Inc. ("Hwaci") of Charlotte, N.C., USA.

With continuing reference to FIG. 14, in an embodiment, the trace aggregator 1413 accepts the user request 1411 from a user. The user request may be, for example, a search or other informational request. The trace aggregator 1413 may break out and sort the request by related sets, for example, by geographical region. The trace aggregator 1413 can therefore added to the real-time nature and the scalability of the system 1400 by determining, geographically, where a request should be directed. The trace aggregator 1413 then directs the request to the one or more load balancers 1415.

In an example embodiment, the one or more load balancers 1415 may be similar to and serve similar or the same functions as various ones of the load balancers (e.g., 26, 36, 56) of FIGS. 1 and 2. The one or more load balancers 1415 may be self-managing. For example, the one or more load balancers 1415 may balance the load with a certain periodicity (e.g., hourly). They may balance by pool and functionality, by time, or by geography. The one or more load balancers 1415 may self-manage by balancing for an upcoming time period and redistribute or rebalance the demand load.

The web service module 1409 receives the request from the trace aggregator 1413. The web service module 1409 can also sort the requests by geography, time, and function. The web service module 1409 then receives a response to the request from the file system 1405.

Figure 15:
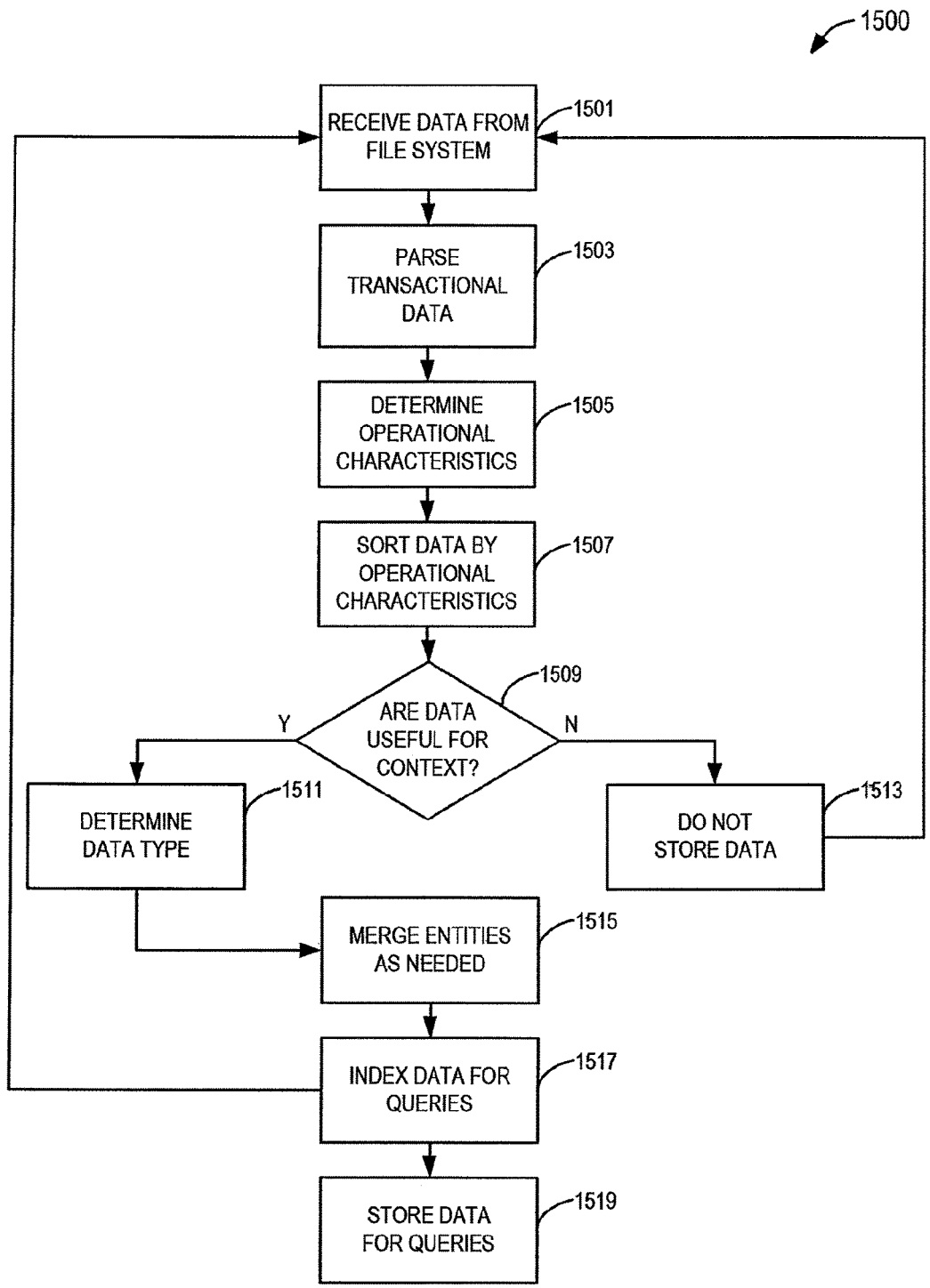
FIG. 15 is a flowchart illustrating an example embodiment of a method to determine, organize, and store relevant data.

FIG. 15 is a flowchart illustrating an example embodiment of a method 1500 to determine, organize, and store relevant transactional data. Although the method 1500 is discussed in relation to various systems already described herein, the method may be used in various other environments as well. Further, although a particular flow is indicated mainly for clarity in presentation, many or all of the operations may be performed in orders other than those shown. Also, many of the operations may be performed concurrently and not necessarily sequentially as indicated by FIG. 15.

At operation 1501, the transactional data are received from a file system. As discussed above, the data may be obtained from, for example, the cluster 16 of the harvesters 18 discussed above with reference to FIG. 1 or the file system 1405 of FIG. 14. The data are then parsed at 1503 (e.g., stripping out and separating header information, payload information, and so on). A determination of operational characteristics of the data is performed at operation 1505 and the data are then sorted according to these characteristics at operation 1507. A determination is then made at operation 1509 whether the remaining sorted data are useful, as discussed above, based on certain predetermined parameters. The determination may be further based on whether the remaining sorted data are useful for a context in which a user request is presented. For example, if a user is requesting a search for a given item (e.g., an iPod® with at least 4 GB of memory) but the user also includes a request "for music storage," the "for music storage" is not considered relevant search data for the context since any iPod® is capable of storing music.

If the data are useful, a determination of the type of data (e.g., operational data or business-relevant data) is made at operation 1511. Entities within the data (e.g., "user," user ID," or "UID") may be merged at operation 1515 to more readily produce relevant search results. The data are then indexed in a non-relational manner at operation 1517. As discussed above, the data may be indexed by time, space, and functionality. The indexed data are then stored at operation 1519 for subsequent retrieval by search queries. The data may be stored, as discussed above, on a serverless, non-relational data storage system such as standard storage. The storage may occur on, for example, the file system 1405 of FIG. 14. The method 1500 either concurrently with the storage or after the data are indexed resumes at operation 1501.

Referring again to the determination made at operation 1509 whether the data are useful, if the data are not useful, a decision is made at operation 1513 not to store the data and the method 1500 resumes at operation 1501.

Thus, a method and system to monitor a diverse heterogeneous application environment have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to organize transactional data, the method including:
   reading the transactional data from an instrumented plurality of hardware-based application servers in substantially real-time as the transactional data are produced, the plurality of hardware-based application servers being instrumented to monitor a predetermined set of activities and parameters of a respective one of the plurality of hardware-based application servers;
   communicating messages reflecting the set of activities and parameters;
   receiving the transactional data from a file system within an application environment, the transactional data including operations data from the instrumented plurality of hardware-based application servers within the application environment;
   organizing the transactional data by operational characteristics based on the operations of the plurality of hardware-based application servers;
   indexing the data in a non-relational manner; and
   storing the indexed data.

2. The method of claim 1, wherein the transactional data are organized by time, space, and functionality.

3. The method of claim 1, wherein the transactional data are received in substantially real-time from the plurality of hardware-based application servers.

4. The method of claim 1, further comprising:
   receiving a user request to the transactional data;
   accepting and sorting the user request to the transactional data by a first geographic region; and
   preparing a response to the user request based on the indexed data.

5. The method of claim 4, further comprising:
   making a determination of a second geographic region to which the user request is to be directed; and
   directing the user request to the second geographic region.

6. The method of claim 4, further comprising:
   breaking out portions of the user request; and
   sorting the user request by related sets.

7. The method of claim 1, further comprising:
   parsing the received transactional data into operational data and business-related data, the operational data including errors and warnings generated by the hardware-based plurality of servers, the business-related data including calls requesting customer support; and
   making a determination of operational characteristics associated with the transactional data.

8. The method of claim 1, further comprising making a determination whether the organized transactional data are useful for a context in which a user request is presented.

9. A system to organize transactional data, the system including:
   an instrumented plurality of hardware-based application servers within an application environment, the instrumentation to monitor a predetermined set of activities and parameters of a respective one of the plurality of hardware-based application servers and to communicate the messages reflecting the set of activities and parameters;
   a file system arranged as a non-relational and serverless file system, the file system to receive, in substantially real-time, unsorted transactional data from publishing modules contained within each of the instrumented plurality of hardware-based application servers;
   one or more hardware-based daemon indexers coupled to the file system to:
      receive the unsorted transactional data from the file system, the transactional data including operations data from the instrumented plurality of hardware-based application servers;
      organize the unsorted transactional data by operational characteristics based on the operations of the plurality of instrumented hardware-based application servers; and
      store the organized transactional data on the file system.

10. The system of claim 9, further comprising an application module to provide application services within the application environment.

11. The system of claim 9, wherein the file system is a disk array.

12. The system of claim 9, further comprising a plurality of harvesters to collect the transactional data from the plurality of hardware-based application servers.

13. The system of claim 9, wherein the one or more hardware-based daemon indexers are further configured to index and store the transactional data, on a substantially real-time basis, by a time parameter, a functionality parameter, and a space parameter.

14. The system of claim 13, wherein the space parameter relates to a geographic location.

15. The system of claim 9, wherein the file system is in direct electrical communication with the one or more daemon indexers with no intermediary server located therebetween.

16. The system of claim 9, further comprising a trace aggregator in electrical communication with the file system to accept a user request relating to the transactional data within a first geographic region.

17. The system of claim 16, where the trace aggregator is further to make a determination of a second geographic region to which the user request is to be directed based on a determination of a load within the system.

18. The system of claim 16, wherein the trace aggregator is further to break out and sort the user request by related sets.

19. The system of claim 16, further comprising a web service module to:
   sort the user requests request by geography, time, and function; and
   receive a response to the user request from the file system.

20. A tangible computer-readable storage medium having no transitory signals, the tangible computer-readable storage medium containing instructions that, when executed by one or more processors, cause the one or more processors to perform operations comprising:

reading transactional data from an instrumented plurality of hardware-based application servers in substantially real-time as the transactional data are produced, the plurality of hardware-based application servers being instrumented to monitor a predetermined set of activities and parameters of a respective one of the plurality of hardware-based application servers;
   communicating the monitoring client communicating messages reflecting the set of activities and parameters;
   receiving the transactional data from a file system within an application environment, the transactional data including operations data from the instrumented plurality of hardware-based application servers within the application environment;
   organizing the transactional data by operational characteristics based on the operations of the plurality of hardware-based application servers;
   indexing the data in a non-relational manner; and
   storing the indexed data.

* * * * *